(12) United States Patent
Shin et al.

(10) Patent No.: US 8,067,511 B2
(45) Date of Patent: Nov. 29, 2011

(54) ETHYLENE COPOLYMER AND A METHOD OF PREPARING THE SAME

(75) Inventors: Daeho Shin, Daejeon (KR); Choonsik Shim, Daejeon (KR); Jisu Jeong, Daejeon (KR); Sungseok Chae, Daejeon (KR); Myungahn Ok, Daejeon (KR); Seungbum Kwon, Daejeon (KR); Dong-Cheol Shin, Daejeon (KR); Ho-Seong Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 61 days.

(21) Appl. No.: 12/557,801

(22) Filed: Sep. 11, 2009

(65) Prior Publication Data

US 2010/0120981 A1    May 13, 2010

(30) Foreign Application Priority Data

Sep. 12, 2008  (KR) ........................ 10-2008-0090522
Sep. 2, 2009   (KR) ........................ 10-2009-0082291

(51) Int. Cl.
*C08F 4/6592*  (2006.01)
*C08F 210/02*  (2006.01)

(52) U.S. Cl. .......... 526/65; 526/134; 526/160; 526/165; 526/352; 526/943; 524/240

(58) Field of Classification Search ................. 524/65, 524/134, 160, 165, 943, 240; 526/65, 134, 526/160, 165, 352, 943
See application file for complete search history.

(56) References Cited

U.S. PATENT DOCUMENTS

| | | | |
|---|---|---|---|
| 3,592,880 A | 7/1971 | Biedrich et al. | |
| 4,309,521 A | 1/1982 | Sato et al. | |
| 4,368,291 A | 1/1983 | Frese et al. | |
| 4,368,304 A | 1/1983 | Sato et al. | |
| 4,420,592 A | 12/1983 | Kato et al. | |
| 4,935,474 A | 6/1990 | Ewen et al. | |
| 5,198,401 A | 3/1993 | Turner et al. | |
| 5,684,097 A * | 11/1997 | Palmroos et al. | 526/64 |
| 6,277,931 B1 | 8/2001 | Jaber et al. | |
| 6,355,741 B1 * | 3/2002 | Marechal | 526/64 |
| 6,372,864 B1 | 4/2002 | Brown | |
| 6,995,216 B2 | 2/2006 | Winslow et al. | |
| 2006/0235147 A1 | 10/2006 | Goyal et al. | |
| 2007/0004586 A1 * | 1/2007 | Woo et al. | 502/117 |

FOREIGN PATENT DOCUMENTS

| | | |
|---|---|---|
| EP | 0 040 992 | 5/1984 |
| EP | 0 057 420 | 5/1986 |
| EP | 0 237 294 | 12/1991 |
| GB | 1 505 017 | 3/1978 |
| GB | 1 532 231 | 11/1978 |
| GB | 2 020 672 | 11/1979 |
| KR | 10-2007-0104845 | 10/2007 |
| WO | 92/12182 | 7/1992 |
| WO | 94/17112 | 8/1994 |
| WO | 2006/048257 | 5/2006 |

OTHER PUBLICATIONS

Tetsuya, Yoshigio et al., "High Performance PE100 Resin with Extraordinary Resistance of Slow Crack Growth" (2007) Plastics Pipes XIII Conference.

* cited by examiner

*Primary Examiner* — Caixia Lu
(74) *Attorney, Agent, or Firm* — Clark & Brody

(57) ABSTRACT

Provided are ethylene copolymers and a process for preparing the same. More specifically, provided are ethylene copolymers exhibiting excellent processibility and physical properties due to its multimodal molecular weight distribution index, through a multi-stage process by using reactors connected in series or in parallel in the presence of catalyst composition containing transition metal catalyst, and a process for preparing the same.

18 Claims, 2 Drawing Sheets

ETHYLENE COPOLYMER AND A METHOD OF PREPARING THE SAME

TECHNICAL FIELD

The present invention relates to ethylene copolymers and a process for preparing the same. More specifically, it relates to ethylene copolymer exhibiting excellent processibility and physical properties due to its multimodal molecular weight distribution index, and a process for preparing the same via multi-stage synthesis.

BACKGROUND ART

Generally, polymers polymerized by using a single site catalyst show narrow molecular weight distribution and uniform distribution of comonomers, with higher copolymerization activity than that of Ziegler-Natta catalyst. However, due to their narrow molecular weight distribution, the processing would require large energy consumption and be difficult to be performed by using existing equipments, but increasing the processing cost. When the techniques for polymerizing olefin by the use of single site catalyst are analyzed from the viewpoint of conventional commercialized processes, they can be directly applied (in case of a high-pressure solution process) if the solubility of the single site catalyst in solvent is sufficiently high, and significant issues would be stability of catalyst at relatively high polymerization temperature, and removal of catalytic activity during the work-up process after the reactor, as well as separation of impurities and reaction inhibitors during the course of isolating, purifying and recovering the solvent.

In order to ensure processibility as well as improved physical properties of ethylene copolymer which is polymerized by using single site transition metal catalyst, it is advantageous for the copolymer to have broader molecular weight distribution, or molecular weight distribution showing two or more peaks in the molecular weight distribution curve.

In order to manufacture such ethylene copolymer with improved processibility and physical properties, U.S. Pat. No. 4,935,474 discloses a process wherein two or more metallocene catalysts having different reaction rates are used in one reactor. According to this process, however, it is difficult to prepare ethylene copolymer with various density distributions, though polymers having relatively broad molecular weight distribution or bimodal molecular weight distribution could be prepared.

U.S. Pat. No. 3,592,880, EP 057420 and 237294, GB Patent 2020672, or the like disclose slurry-slurry multi-stage polymerization processes; GB Patent 1505017, EP 040992, U.S. Pat. No. 4,420,592, or the like gas-gas multi-stage polymerization processes; and GB Patent 1532231, U.S. Pat. Nos. 4,368,291, 4,309,521, 4,368,304 or the like slurry-gas multi-stage processes. Though WO 9212182 states that two or more stage are possible for gas process in a slurry-gas process, only bimodal molecular weight distribution via a two-stage process is shown, due to catalyst characteristics and accordingly introduction of hydrogen. Examples of the patent suggest production of ethylene copolymer with restricted density of at least 0.930 g/cm$^3$, so that the process implies limitation to produce ethylene copolymer resin of various use, such as film with high impact strength.

WO 1994/17112 proposes a process for preparing ethylene copolymer with broad molecular weight distribution by using metallocene and Ziegler-Natta catalyst in solution polymerization, but this process provides only bimodal molecular weight distribution with limitation in improvement of physical properties of the polymer through the modified process.

U.S. Pat. No. 6,277,931 also discloses a process for polymerizing ethylene having bimodal molecular weight distribution by using heterogeneous catalyst (metallocene and Ziegler-Natta) in a solution polymerization process. However, when heterogeneous catalyst is used in a system, interference between the heterogeneous catalysts or with cocatalyst may occur, so that the reaction would be hardly controlled. The cocatalyst for Ziegler-Natta catalyst may act as catalyst poison or reaction inhibitor against single site catalyst.

WO 2006/048257 proposed a process for ethylene copolymer with broad molecular weight distribution and trimodal molecular weight distribution via three reactors. The process is designed as a slurry-gas process wherein high density polyethylene with high molecular weight is partially synthesized in a prepolymer reactor prior to the slurry process, and then slurry and gas phase process are carried out to provide ethylene copolymer having trimodal and broad molecular weight distribution. However, the high molecular weight portion with high density may result in deleterious effect on impact strength of film from the aspect of overall resin.

U.S. Pat. No. 6,372,864 proposed a process for preparing ethylene copolymer having satisfactory physical properties and processibility by using single site catalyst containing phosphinimine ligand(s) in two stirred tank reactors. According to the process, however, a large amount of comonomer should be employed in the process to give low density, due to the catalyst property, and thus comonomer would remain in the final polymer product to cause problems in odor and hygiene.

U.S. Pat. No. 6,995,216 suggests a process for preparing ethylene copolymer having broad molecular weight distribution by using single site catalyst containing crosslinked indenoindolyl ligand(s) in a multi-stage or multiple reactor(s). But the process does not consider complete mixing of the reactants through the multi-stage, so that the polymer synthesized in each stage may have disadvantages due to insufficient mixing.

DISCLOSURE

Technical Problem

In order to overcome the problems of conventional techniques, the present inventors carried out extensive studies, and invented a multi-stage solution reaction process for preparing ethylene copolymer having narrow molecular weight distribution and uniform density distribution with controlling the features of ethylene copolymer by the multi-stage synthetic process using appropriate single site catalyst to improve physical properties as well as processibility of the ethylene copolymer. Thus, the polymers having various molecular weights, comonomer contents or densities are prepared with different monomers, comonomer compositions, reaction temperatures, reaction pressures, or the like, in individual reactors among two or more reactors connected in multi-stage.

Specifically, according to the multi-stage solution reaction process as described above, ethylene copolymers having different density distribution with multi-modal molecular weight distribution, preferably at least bimodal or more molecular weight distribution, can be prepared in each reactor by using α-olefin comonomer having at least three carbon atoms. The invention is completed based on such discoveries. Particularly, copolymers having high molecular weight can be prepared by using single site catalyst according to the present invention, in spite of high degree of comonomer coupling.

Thus, as a solution of such problems, one object of the invention is to provide ethylene copolymer having multimodal molecular weight distribution with improved physical properties as well as processability which is prepared via multi-stage synthesis of ethylene or α-olefin, and a process for preparing the same.

Another object of the present invention is to overcome the disadvantages caused by preparation by blending, and to provide ethylene copolymer which can be easily produced and applied to various use, and a process for preparing the same.

Technical Solution

To achieve the objects of the present invention, one aspect of the present invention provides a process for preparing ethylene copolymer, which comprises (a) polymerizing ethylene and one or more C3-C18 α-olefin comonomer(s) in the presence of a catalyst composition containing a transition metal catalyst represented by Chemical Formula (1) in one or more reactor(s) to produce a first copolymer; and (b) passing the first copolymer prepared from stage (a) through at least one other reactor(s) containing ethylene or ethylene and at least one C3-C18 α-olefin at a temperature higher than the reaction temperature of stage (a) in the presence of the same catalyst composition employed in stage (a) in order to prepare polymer of high temperature which contains ethylene and C3-C18 α-olefin copolymer composition.

Another aspect of the present invention provides a process for preparing ethylene copolymer, which comprises (a) polymerizing ethylene and one or more C3-C18 α-olefin comonomer(s) in the presence of a catalyst composition containing a transition metal catalyst represented by Chemical Formula (1) in one or more reactor(s) to produce a first copolymer; (b) reacting the ethylene or ethylene and one or more C3-C18 α-olefin at a temperature higher than the reaction temperature of stage (a) in the presence of the same catalyst composition employed in stage (a) in at least one other reactor(s), in order to prepare a second copolymer; and (c) mixing the first copolymer with the second copolymer.

[Chemical Formula 1]

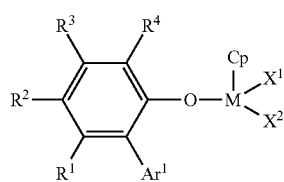

In the formula, M represents transition metal from Group 4 in the Periodic Table of Elements;

Cp represents a cyclopentadienyl ring which is $\eta^5$-linkable to the core metal M, or a fused ring containing a cyclopentadienyl ring, in which the cyclopentadienyl ring or the fused ring containing a cyclopentadienyl ring may be further substituted by one or more substituents selected from (C1-C20)alkyl, (C6-C30)aryl, (C2-C20)alkenyl and (C6-C30)ar(C1-C20)alkyl;

$R^1$ through $R^4$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of $R^1$ through $R^4$ may be linked to an adjacent substituent via (C3-C12)alkylene or (C3-C12) alkenylene with or without containing a fused ring to form an alicyclic ring, or a monocyclic or polycyclic aromatic ring;

$Ar^1$ represents (C6-C30)aryl or (C3-C30)heteroaryl containing one or more heteroatom(s) selected from N, O and S;

$X^1$ and $X^2$ independently represent halogen atom, (C1-C20)alkyl, (C3-C20)cycloalkyl, (C6-C30)ar(C1-C20)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, or

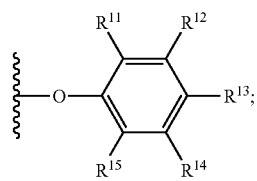

$R^{11}$ through $R^{15}$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or $R^{11}$ through $R^{15}$ may be linked to an adjacent substituent via (C3-C12)alkylene or (C3-C12) alkenylene with or without containing a fused ring to form an alicyclic ring, or a monocyclic or polycyclic aromatic ring; and the alkyl, aryl, cycloalkyl, aralkyl, alkoxy, alkylsiloxy, arylsiloxy, alkylamino, arylamino, alkylthio or arylthio of $R^1$ through $R^4$, $R^{11}$ through $R^{15}$, $X^1$ and $X^2$; the ring formed by linkage of each of $R^2$ through $R^4$ or $R^{11}$ through $R^{15}$ to an adjacent substituent via alkylene or alkenylene; or the aryl or heteroaryl of $Ar^1$ and $Ar^{11}$ may be further substituted by one or more substituent(s) selected from halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro and hydroxyl.

Now, preferable embodiments of the present invention are described in more detail with referring to the drawings appended. It is to be noted that same reference numbers are given to identical constituents or parts in the drawings. In the description of the invention, specific explanations on relevant known functions or structures are omitted in order to avoid ambiguity.

The term, "about", "substantially" or the like, used herein to mention an extent (or amount), means the value or approximate value when an inherent tolerance is suggested in a preparation or a substance; and the term is used to avoid an unconscionable infringer from inappropriate use of the present disclosure (which mentions exact or absolute value in order to facilitate understanding of the present invention).

The ethylene copolymers according to the invention can be prepared via at least two stages, and have narrow molecular weight distribution. The preparation requires a single site catalytic system which can provide high bond strength between comonomers with narrow density distribution. Used can be a Group 4 transition metal catalyst which is not crosslinked by a legand and comprises a cyclopentadiene derivative and at least one aryloxide ligand(s) having aryl derivative substituted at ortho-position, or a catalyst composition comprising such transition metal catalyst and aluminoxane cocatalyst or boron compound cocatalyst.

Furthermore, a stage to provide at least bimodal molecular weight distribution is applied to the process in order to overcome the low processibility due to narrow molecular weight distribution of the polymer polymerized by using a single site catalyst. A solution polymerization process, wherein high molecular weight α-olefin preferably having at least 3 carbon atoms, preferably at least 6 carbon atoms can be applied as comonomer, is carried out.

Thus, due to lower density of the high molecular weight portion than that of other molecular weight portion, the existing frequency of tie molecules in the molecular chain increases, so that impact strength is increased in case of being used for film, and long-term durability at high temperature is improved in case of being used as pipe.

Now the invention is described in detail.

1. Specification of the Catalyst Used

The catalyst used according to the present invention is a catalyst composition comprising the transition metal catalyst represented by Chemical Formula (1) and cocatalyst. The cocatalyst can be selected from boron compounds or aluminum compounds, or mixtures thereof.

First, the compound represented by Chemical Formula (1) is a Group 4 transition metal catalyst which comprises cyclopentadiene derivative and at least one aryloxide ligand(s) having aryl derivative substituted at ortho-position around the transition metal, without having any linkage between the ligands.

[Chemical Formula 1]

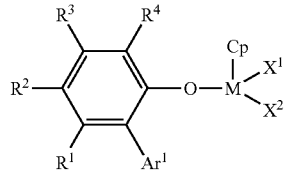

In the transition metal catalyst of Chemical Formula (1), the core metal M represents transition metal from Group 4 in the Periodic Table of Elements, preferably titanium, zirconium or hafnium. In the formula, Cp represents a cyclopentadienyl ring which is $\eta^5$-linkable to the core metal M, or a fused ring containing a cyclopentadienyl ring, in which the cyclopentadienyl ring or the fused ring containing a cyclopentadienyl ring may be further substituted by one or more substituents selected from (C1-C20)alkyl, (C6-C30)aryl, (C2-C20)alkenyl and (C6-C30)ar(C1-C20)alkyl. Specific examples of Cp include cyclopentadienyl, methyl cyclopentadienyl, dimethylcyclopentadienyl, tetramethylcyclopentadienyl, pentamethylcyclopentadienyl, butylcyclopentadienyl, sec-butylcyclopentadienyl, tert-butylmethylcyclopentadienyl, trimethylsilylcyclopentadienyl, indenyl, methylindenyl, dimethylindenyl, ethylindenyl, isopropylindenyl, fluorenyl, methylfluorenyl, dimethylfluorenyl, ethylfluorenyl, isopropylfluorenyl, and so on.

Groups $R^1$ through $R^4$ on the arylphenoxide ligand in Chemical Formula (1) may independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio or nitro, or each of $R^1$ through $R^4$ may be linked via (C3-C12) alkylene or (C3-C12) alkenylene with or without containing a fused ring to form an alicyclic ring, or a monocyclic or polycyclic aromatic ring;

$Ar^1$ represents (C6-C30)aryl or (C3-C30)heteroaryl containing one or more heteroatom(s) selected from N, O and S;

$X^1$ and $X^2$ independently represent halogen, (C1-C20)alkyl, (C3-C20)cycloalkyl, (C6-C30)ar(C1-C20)alkyl, (C1-C20)alkoxy, (C3-C20) alkylsiloxy, (C6-C30)arylsiloxy, (C1-C20)alkylamino, (C6-C30) arylamino, (C1-C20)alkylthio, (C6-C30)arylthio, or

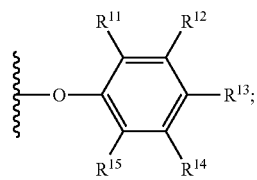

$R^{11}$ through $R^{15}$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of $R^{11}$ through $R^{15}$ may be linked to an adjacent substituent via (C3-C12)alkylene or (C3-C12) alkenylene with or without containing a fused ring to form an alicyclic ring, or a monocyclic or polycyclic aromatic ring; and the alkyl, aryl, cycloalkyl, aralkyl, alkoxy, alkylsiloxy, alkylamino, arylamino, alkylthio or arylthio of $R^1$ through $R^4$, $R^{11}$ through $R^{15}$, $X^1$ and $X^2$; the ring formed by linkage of each of $R^1$ through $R^4$ or $R^{11}$ through $R^{15}$ to an adjacent substituent via alkylene or alkenylene; and aryl or heteroaryl of $Ar^1$ and $Ar^{11}$ may be further substituted by one or more substituent(s) selected from halogen atom, (C1-C20)alkyl, (C3-C20)cycloalkyl, (C6-C30)aryl, (C6-C30)ar(C1-C10) alkyl, (C1-C20)alkoxy, (C3-C20)alkylsiloxy, (C6-C30) arylsiloxy, (C1-C20) alkyl amino, (C6-C30)arylamino, (C1-C20) alkylthio, (C6-C30)arylthio, nitro and hydroxyl.

Examples of halogen atoms include fluorine, chlorine, bromine and iodine atoms. Examples of (C1-C20)alkyl or (C3-C20)cycloalkyl include methyl, ethyl, n-propyl, isopropyl, n-butyl, sec-butyl, tert-butyl, n-pentyl, neopentyl, n-hexyl, n-octyl, n-decyl, n-dodecyl, n-pentadecyl and n-eicosyl, of which methyl, ethyl, isopropyl or tert-butyl being preferable; examples of (C6-C30)aryl include phenyl, naphthyl, anthracenyl and fluorenyl; examples of (C6-C30)ar(C1-C20)alkyl group include benzyl, (2-methylphenyl)methyl, (3-methylphenyl)methyl, (4-methylphenyl)methyl, (2,3-dimethylphenyl)methyl, (2,4-dimethylphenyl)methyl, (2,5-dimethylphenyl)methyl, (2,6-dimethylphenyl)methyl, (3,4-dimethylphenyl)methyl, (4,6-dimethylphenyl)methyl, (2,3,4-trimethylphenyl)methyl, (2,3,5-trimethylphenyl)methyl, (2,3,6-trimethylphenyl)methyl, (3,4,5-trimethylphenyl)methyl, (2,4,6-trimethylphenyl)methyl, (2,3,4,5-tetramethylphenyl)methyl, (2,3,4,6)-tetramethylphenyl)methyl, (2,3,5,6-tetramethylphenyl)methyl, (pentamethylphenyl)methyl, (ethylphenyl)methyl, (n-propylphenyl)methyl, (isopropylphenyl)methyl, (n-butylphenyl)methyl, (sec-butylphenyl) methyl, (n-tetradecylphenyl)methyl, triphenylmethyl, naphthylmethyl and anthracenylmethyl, of which benzyl or triphenylmethyl being preferable; examples of (C1-C20) alkoxy include methoxy, ethoxy, n-propoxy, isopropoxy, n-butoxy, sec-butoxy, tert-butoxy, n-pentoxy, neopentoxy, n-hexoxy, n-octoxy, n-dodecoxy, n-pentadecoxy and n-eicocoxy, of which methoxy, ethoxy, isopropoxy or tert-butoxy being preferable; examples of (C3-C20)alkylsiloxy or (C6-C30)arylsiloxy include trimethylsiloxy, triethylsiloxy, tri-n-propylsiloxy, triisopropylsiloxy, tri-n-butylsiloxy, tri-sec-butylsiloxy, tri-tert-butylsiloxy, tri-isobutylsiloxy, tert-butyldimethylsiloxy, tri-n-pentylsiloxy, tri-n-hexylsiloxy, tricyclohexylsiloxy, phenylsiloxy, diphenylsiloxy and naphthylsiloxy, of which trimethylsiloxy, tert-butyldimethylsiloxy or phenylsiloxy being preferable.

Examples of (C1-C20)alkylamino or (C6-C30)arylamino include dimethylamino, diethylamino, di-n-propylamino, diisopropylamino, di-n-butylamino, di-sec-butylamino, di-tert-butylamino, diisobutylamino, tert-butylisopropylamino, di-n-hexylamino, di-n-octylamino, di-n-decylamino, diphenylamino, dibenzylamino, methylethylamino, methylphenylamino and benzylhexylamino, of which dimethylamino, diethylamino or diphenylamino being preferable; and examples of (C1-C20)alkylthio or (C6-C30)arylthio include methylthio, ethyl thio, isopropylthio, phenylthio and naphthylthio.

Specific examples of the compounds of Chemical Formula (1) may be represented by one of the following Chemical Formulas:

[Chemical Formula 1-1]

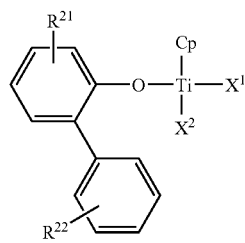

[Chemical Formula 1-2]

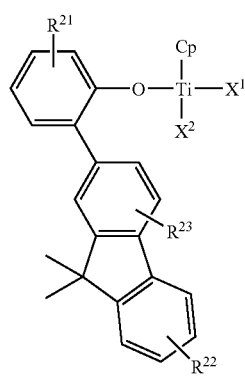

[Chemical Formula 1-3]

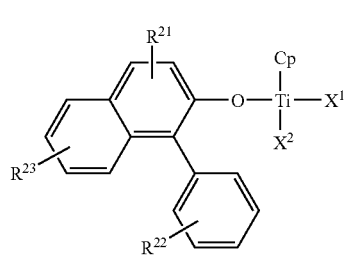

[Chemical Formula 1-4]

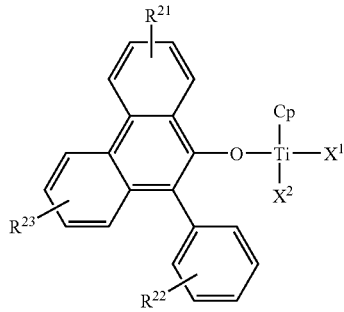

[Chemical Formula 1-5]

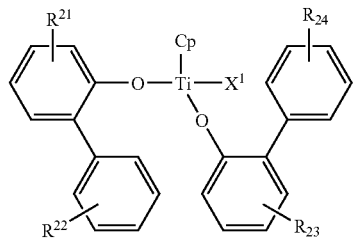

[Chemical Formula 1-6]

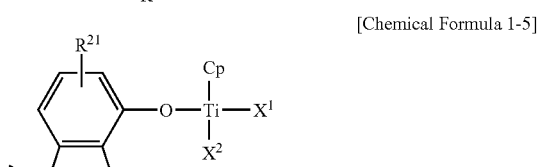

[Chemical Formula 1-7]

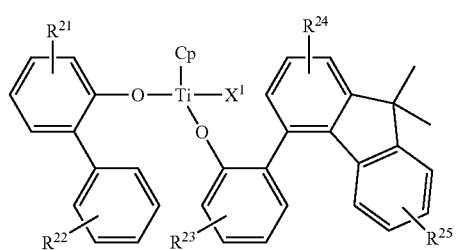

[Chemical Formula 1-8]

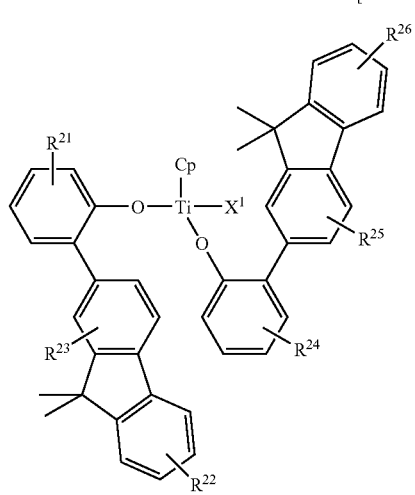

[Chemical Formula 1-9]

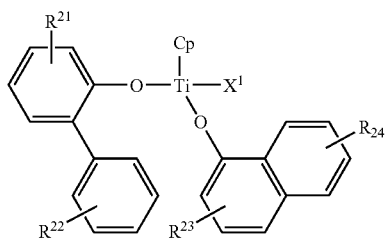

[Chemical Formula 1-10]

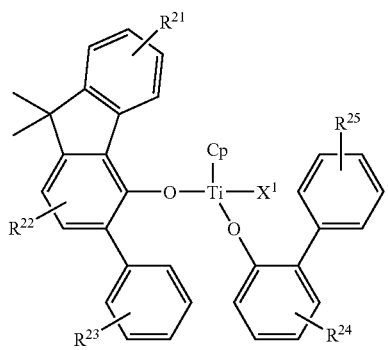

[Chemical Formula 1-11]

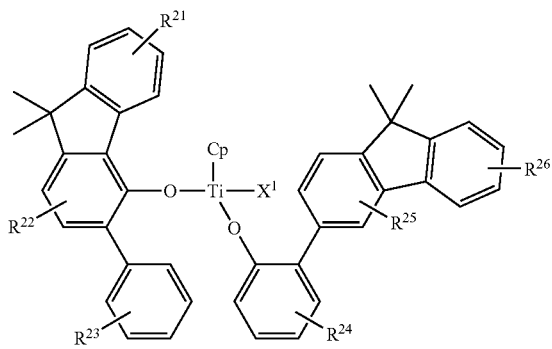

[Chemical Formula 1-12]

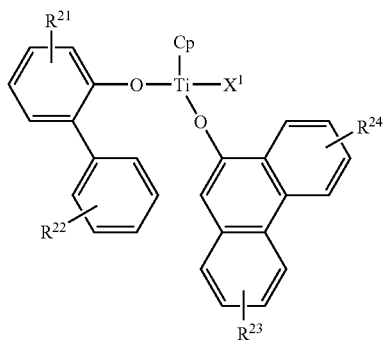

[Chemical Formula 1-13]

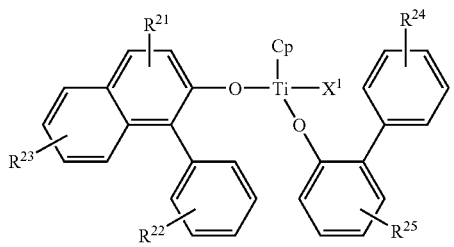

[Chemical Formula 1-14]

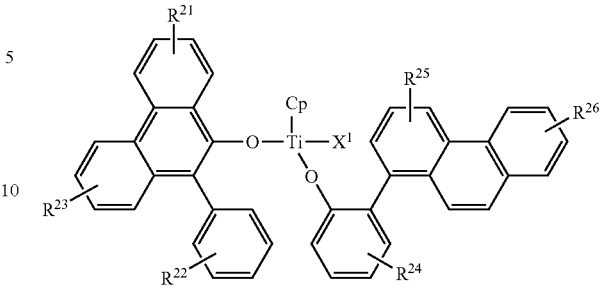

In the formulas, $R^{21}$ through $R^{26}$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of $R^{21}$ through $R^{26}$ may be linked to an adjacent substituent via (C3-C12)alkylene or (C3-C12) alkenylene with or without containing a fused ring to form an alicyclic ring, or a monocyclic or polycyclic aromatic ring; the alkyl, aryl, cycloalkyl, aralkyl, alkoxy, alkylsiloxy, aryisiloxy, alkylamino, acylamino, alkylthio or arylthio of $R^{21}$ through $R^{26}$ may be further substituted by one or more substituent(s) selected from halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro and hydroxyl;

Cp represents a cyclopentadienyl ring which is $\eta^5$-linkable to the core metal M, or a fused ring containing a cyclopentadienyl ring, in which the cyclopentadienyl ring or the fused ring containing cyclopentadienyl ring may be further substituted by one or more substituents selected from (C1-C20)alkyl, (C6-C30)aryl, (C2-C20)alkenyl and (C6-C30)ar(C1-C20)alkyl; and $X^1$ and $X^2$ represent methyl or Cl.

More specifically, the present invention provides a process for preparing ethylene copolymer which is characterized in that the transition metal catalyst is selected from the following compounds:

1-1-1

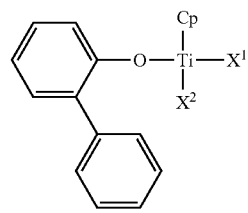

1-1-2

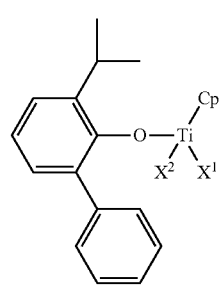

-continued
1-2-1
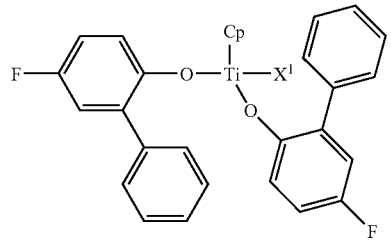
1-3-1
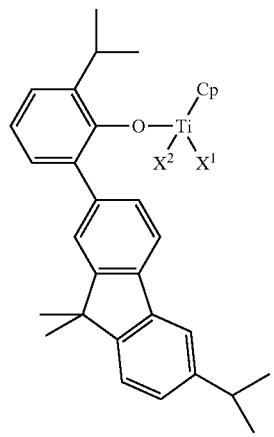
1-6-3
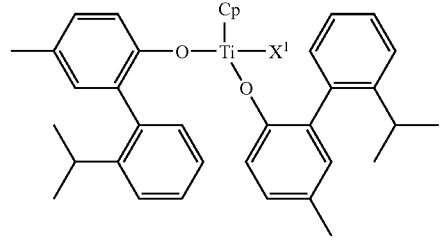
1-4-1
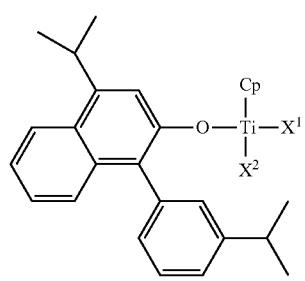
1-6-4
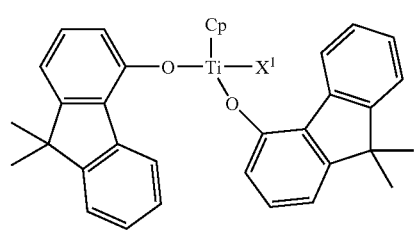
1-7-1
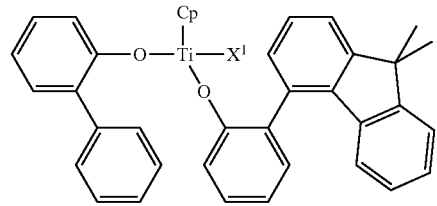
1-5-1
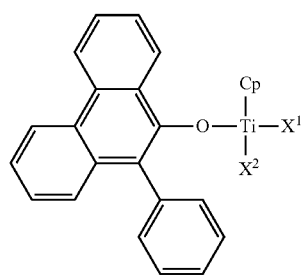
1-8-1
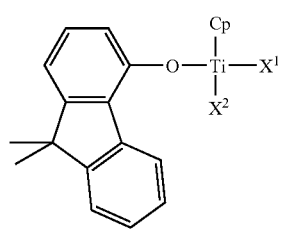
1-6-1
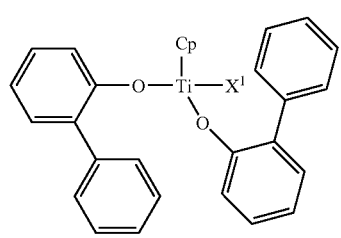
1-9-1
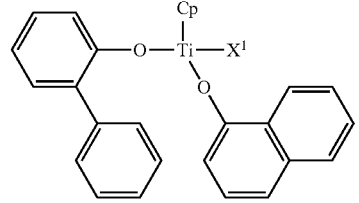

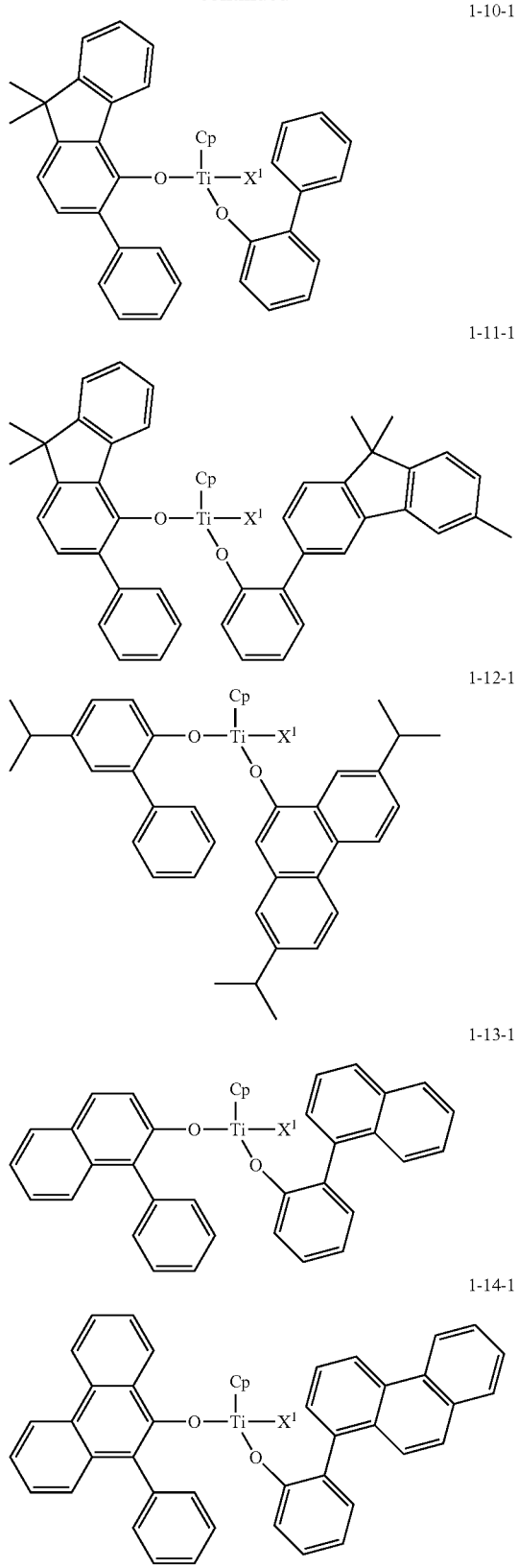

In the formulas, Cp represents a cyclopentadienyl ring which is η⁵-linkable to the core metal M, or a fused ring containing a cyclopentadienyl ring, in which the fused ring containing cyclopentadienyl ring may be further substituted by one or more substituents selected from (C1-C20)alkyl, (C6-C30)aryl, (C2-C20)alkenyl and (C6-C30)ar(C1-C20)alkyl; and $X^1$ and $X^2$ represent methyl or Cl.

In order for the transition metal catalyst of Chemical Formula (1) to become an active catalyst component for olefin polymerization, an aluminum compound or boron compound, or a mixture thereof, which can extract X ligand from the transition metal compound to make the core metal become a cation, while serving as a counterion (anion) with weak bond strength, is employed as cocatalyst. Though the organic aluminum compound used herein is to remove trace amount of polar substances (which functions as catalyst poison in the reaction solvent), it may serve as alkylating agent when X ligand is halogen.

Boron compounds which can be used as cocatalyst according to the present invention can be selected from the compounds represented by one of Chemical Formulas (2) to (4), as can be found in U.S. Pat. No. 5,198,401.

$B(R^{31})_3$            [Chemical Formula 2]

$[R^{32}]^+[B(R^{31})_4]^-$            [Chemical Formula 3]

$[(R^{33})_q ZH]^+[B(R^{31})_4]^-$            [Chemical Formula 4]

In Chemical Formulas (2) to (4), B represents boron atom; $R^{31}$ represents phenyl, which may be further substituted by three to five substituents selected from fluorine atom, (C1-C20)alkyl with or without fluorine substituent(s), or (C1-C20)alkoxy with or without fluorine substituent(s); $R^{32}$ represents (C5-C7)cycloalkyl radical, (C1-C20)alkyl(C6-C20)aryl radical, or (C6-C30)ar(C1-C20)alkyl radical such as triphenylmethyl radical; Z represents nitrogen or phosphorus atom; $R^{33}$ represents anilinium radical which is substituted by two (C1-C4)alkyl group together with (C1-C20)alkyl radical or nitrogen atom; and q is an integer of 2 or 3.

Preferable examples of boron-containing cocatalyst tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,2,4-trifluorophenyl)borate, phenylbis(pentafluorophenyl)borate and tetrakis(3,5-bistrifluoromethylphenyl)borate. Specific blends thereof include ferrocenium tetrakis(pentafluorophenyl)borate, 1,1'-dimethylferrocenium tetrakis(pentafluorophenyl)borate, silver tetrakis(pentafluorophenyl)borate, triphenylmethyl tetrakis(pentafluorophenyl)borate, triphenylmethyl tetrakis(3,5-bistrifluoromethylphenyl)borate, triphenylmethyl tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl)borate, N,N-dimethylanilinium tetrakis(pentafluorophenyl)borate, N,N-diethylanilinium tetrakis(pentafluorophenyl)borate, N,N-2,4,6-pentamethylanilinium tetrakis(pentafluorophenyl)borate, N,N-dimethylanilinium tetrakis(3,5-bistrifluoromethylphenyl)borate, diisopropylammonium tetrakis (pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate and tri(dimethylphenyl)phosphonium tetrakis(pentafluorophenyl)borate. Among them, more preferable are N,N-dimethylanilinium tetrakis(pentafluorophenyl)borate, triphenylmethyl tetrakis (pentafluorophenyl)borate and tris (pentafluorophenyl)borane. The molar ratio of core metal M:boron atom preferably is 1:0.1~50, more preferably 1:0.5~15.

The aluminum compounds which are usable according to the present invention include aluminoxane compounds represented by Chemical Formula (5) or (6), organo-aluminum compounds represented by Chemical Formula (7) and organo-aluminum hydrocarbyloxide compounds represented by Chemical Formula (8) or (9).

$$(—Al(R^{41})—O—)_m \qquad \text{[Chemical Formula 5]}$$

$$(R^{41})_2Al—(—O(R^{41})—)_p—(R^{41})_2 \qquad \text{[Chemical Formula 6]}$$

$$(R^{42})_rAl(E)_{3-r} \qquad \text{[Chemical Formula 7]}$$

$$(R^{43})_2AlOR^{44} \qquad \text{[Chemical Formula 8]}$$

$$R^{43}Al(OR^{44})_2 \qquad \text{[Chemical Formula 9]}$$

In Chemical Formulas (5) to (9), $R^{41}$ represents linear or nonlinear (C1-C20)alkyl, preferably methyl or isobutyl; each of m and p represents an integer from 5 to 20; $R^{42}$ and $R^{43}$ represent (C1-C20)alkyl; E represents hydrogen atom or halogen atom; r is an integer from 1 to 3; and $R^{44}$ may be selected from (C1-C20)alkyl and (C6-C30)aryl.

Specific examples which can be used as the aluminum compound include aluminoxane compounds such as methylaluminoxane, modified methylaluminoxane and tetraisobutylaluminoxane; organic aluminum compounds including trialkylaluminium such as trimethylaluminum, triethylaluminum, tripropylaluminum, triisobutylaluminum and trihexylaluminum; dialkylaluminum chloride such as dimethylaluminum chloride, diethylaluminum chloride, dipropylaluminum chloride, diisobutylaluminum chloride and dihexylaluminum chloride; alkylaluminum dichloride such as methylaluminum dichloride, ethylaluminum dichloride, propylaluminum dichloride, isobutylaluminum dichloride and hexylaluminum dichloride; and dialkylaluminum hydride such as dimethylaluminum hydride, diethylaluminum hydride, dipropylaluminum hydride, diisobutylaluminum hydride and dihexylaluminum hydride. Among them, preferable is trialkylaluminum, more preferable is triethylaluminum or triisobutylaluminum. The molar ratio of the core metal M:aluminum atom is preferably from 1:1 to 1:2000, more preferably from 1:5 to 1:1,000.

The molar ratio of the core metal M:boron atom:aluminum atom preferably is 1:0.1~50:1~1,000, more preferably 1:0.5~15:5~500.

2. Solution Polymerization Process

Since ethylene polymerization of the present invention is carried out with at least two stages, two or more reactors are required. Two or three polymerization stages are performed to give broad molecular weight distribution.

The process for preparing ethylene copolymer according to the invention is carried out at reaction temperature of 80~210° C. (stage (a)), and 90~220° C. (stage (b)), under pressure of 20~500 atm.

In stage (a), polymerization is carried out in the presence of said catalyst or catalyst composition, at a temperature from 80 to 210° C., more preferably from 80 to 150° C. under a pressure from 20 to 500 atm, more preferably from 30 to 200 atm. If the reaction temperature is lower than 80° C., the polymer can be hardly produced because the reaction would not occur due to precipitation or insufficient dispersion of the reactants. If it exceeds 210° C., it is impossible to prepare the polymer having predetermined molecular weight. If the pressure is not within the above mentioned range, it is difficult to obtain the polymer having the molecular weight desired.

Thereafter, in stage (b), the polymer prepared from stage (a) is copolymerized with α-olefin in the presence of the same catalyst or catalyst composition used for stage (a) at a temperature from 90 to 220° C., more preferably from 120 to 200° C., under the same pressure as in stage (a). If the temperature is lower than 90° C., polymer may be precipitated, or similar polymer to that obtained from stage (a) is prepared to eliminate the effect of multi-stage polymerization. If the temperature exceeds 220° C., the molecular weight of the polymer becomes too low to impair its physical properties. With regard to the pressure, corresponding results are obtained as in stage (a).

In the meanwhile, the present invention aims at control of physical properties of ethylene copolymer having uniform molecular weight and multi-modal density distribution by means of different process conditions such as amount of ethylene or hydrogen incorporated in stage (a) or (b), and conversion. Particularly, it is intended to improve the physical properties of final resin such as tensile strength and impact strength by optimizing tie molecules in the molecular structure by means of predetermined ratio of high molecular, low-density polymer in stage (a). In stage (b) after (a), same catalyst of catalyst composition is used but the polymerization is performed at a higher temperature to provide ethylene copolymer having different range of molecular weight and density from the polymer prepared in stage (a). Due to the features of the transition metal catalyst according to the invention, the resultant polymer could not help exhibiting narrow molecular weight distribution and density distribution. However, broad molecular weight and density distribution as desired by the manufacturer can be obtained by control through the multi-stage reaction.

Throughout the multi-stage reaction, arrangement of the reactors may be in series or in parallel.

FIG. 1 is a schematic view of reactors arranged in series, according to one preferable embodiment of the present invention. As referring to FIG. 1, the reactors in series include a stage-1 feed pump (11), a stage-1 feed cooler (12), a feed heater (13) of stage-1 reactor, a stage-1 low-temperature reactor (14), a catalyst feed (15) of stage-1 low-temperature reactor, a stage-2 high-temperature reactor connected in series (16), a catalyst feed (17) of stage-2 high-temperature reactor, a feed pump (18) of stage-2 reactor, a feed cooler (19) of stage-2 reactor, a feed heater (20) of stage-2 reactor, a feed (21) of stage-2 reactor and a hydrogen feed (22).

Thus, the reaction in series according to the invention comprises feeding the reactants excluding catalyst to the stage-1 low-temperature reactor (14), which is equipped with a temperature controller and includes the feed cooler (12) of stage-1 reactor and the feed heater (13) of stage-1 reactor through the feed pump (11) of stage-1 reactor; feeding the catalyst through the catalyst feed (15) of stage-1 low-temperature reactor; and carrying out stage (a) at a lower temperature than that of stage-2. The polymer obtained via stage (a) is directly fed to the stage-2 high-temperature reactor connected in series (16) equipped with a feed cooler (19) of stage-2 reactor and a feed heater (20) of stage-2 reactor; the catalyst is fed through the catalyst feed (17) of stage-2 high-temperature reactor; and the reactants to the stage-2 reactor feed (21) through the feed pump (18) of stage-2 reactor, and hydrogen through the hydrogen feed (22); and polymerization of stage (b) is carried out at a higher temperature than that of stage (a). For the reactors connected in series, the overall reactor system has to be designed and controlled by considering ethylene conversion and catalytic activity in stage-1 reaction.

FIG. 2 is a schematic view of reactors arranged in parallel, according to one preferable embodiment of the present invention. As referring to FIG. 2, the reactors in parallel include a feed pump (31) of low-temperature reactor, a feed pump (32) of high-temperature reactor, a feed cooler (33) of low-temperature reactor, a feed heater (34) of low-temperature reactor, a feed cooler (35) of high-temperature reactor, a feed heater (36) of high-temperature reactor, a low-temperature reactor (37), a catalyst feed (38) of low-temperature reactor, a catalyst feed (39) of high-temperature reactor, a high-temperature reactor (40), an in-line mixer (41), a feed (42) of the high temperature reactor, and a hydrogen feed (43).

Thus, stage (a) of the reaction in reactors in parallel is carried out by feeding the reactants (excluding catalyst) through the feed pump (31) of the low-temperature reactor to the low temperature reactor (37) (in which temperature is controlled by the feed cooler (33) of the low temperature reactor and the feed heater (34) of the low temperature reactor); and adding catalyst through the catalyst feed (38) of the low temperature reactor.

Separately from stage (a), reaction is carried out at a higher temperature than that of stage (a), by feeding the reactants (excluding catalyst) through the feed pump (32) of the high-temperature reactor to the high temperature reactor (40) (in which temperature is controlled by the feed cooler (35) of the high temperature reactor and the feed heater (36) of the high temperature reactor), and then through the feed (42) of the high temperature reactor, together with hydrogen feed (43); and adding catalyst through the catalyst feed (39) of the high temperature reactor. The low temperature and high temperature reactants are mixed in the in-line mixer (41) to give homogeneous copolymer.

For the reaction in such reactors in parallel, an in-line mixer is used for homogeneous mixing of the solution from each reactor, in order to provide uniform physical properties of the copolymer. For the purpose of obtaining homogeneous copolymer, any possible unit such as stirred tank as well as an in-line mixer may be employed.

In stages (a) and (b) of the present invention, preferable amounts of ethylene and one or more C3-C18 α-olefin comonomer are 60~99% by weight of ethylene and 1~40% by weight of α-olefin comonomer, respectively. When ethylene content is lower than 60%, physical properties become poor since the desired properties of ethylene do not appear because of the low ethylene content. If it is higher than 99% by weight, effect of copolymer would be lowered.

In stages (a) and (b), specific examples of C3-C18 α-olefin comonomer include propylene, 1-butene, 1-pentene, 4-methyl-1-pentene, 1-hexene, 1-octene, 1-decease, 1-dodecene and mixtures thereof. Among them, more preferable are 1-butene, 1-hexene, 1-octane or 1-decease.

In stages (a) and (b), preferable organic solvent for polymerization is C30-C20 hydrocarbon. Specific examples of solvent include butane, isobutane, pentane, hexane, heptane, octane, isooctane, nonane, decane, dodecane, cyclohexane, methylcyclohexane, benzene, toluene, xylene, and the like. Examples of commercially available solvent suitable for the process are solvent of SK-ISOL series, a type of isoparaffin solvent. For example, SK-ISOL E (available from SK Energy) is C8~C12 aliphatic hydrocarbon solvent having the distillation range of 117~137° C.

Ethylene copolymers prepared according to the process in accordance with the invention is characterized in that they comprise 10~70% by weight of the polymer prepared from stage (a) and 30~90% by weight of the polymer prepared from stage (b); and the polymer from stage (a) has MI of 0.001 to 2.0 g/10 min and density of 0.860 to 0.925 g/cm$^3$, and the polymer from stage (b) is ethylene copolymer having MI of 0.1 to 100.0 g/10 min and density of 0.900 to 0.970 g/cm$^3$.

First, the polymer prepared from stage (a) is contained in an amount of 10~70% by weight, preferably 20~60% by weight. If the polymer content from stage (a) is lower than 10% by weight, improvement in impact strength would not occur. If the content exceeds 70% by weight, transparency is noticeably deteriorated when being processed into film, so that high energy is required for processing, with low productivity.

Molecular weight of the polymer prepared from stage (a), which is based on measurement of MI (melt index) according to ASTM D2839, is MI of 0.001 to 2.0 g/10 min, more preferably from 0.005 to 1.0 g/10 min. If MI of the polymer prepared from stage (a) is less than 0.001 g/10 min, the polymer prepared would be too stiff to result in poor processibility. If it is higher than 2.0 g/10 min, noticeable improvement would not appear in overall physical property of the polymer such as tensile strength and impact strength. According to the report of Tetsuya, Yoshigio, Takagi Hatori et al., 'High Performance PE100 Resin with Extraordinary Resistance of Slow Crack Growth', Plastics Pipes XIII Conference, 2007, it is advantageous to preferentially polymerize the portion of higher molecular weight in order to obtain better dispersion of the portion throughout overall resin, in a multi-stage process for preparing ethylene copolymer with multi-modal molecular weight distribution.

Density of the polymer produced from stage (a) is from 0.860 to 0.925 g/cm$^3$, more preferably from 0.880 to 0.915 g/cm$^3$. If the density is lower than 0.860 g/cm$^3$, the film prepared would have poor physical properties. If it exceeds 0.925 cm$^3$, the film would be too stiff. The polymer prepared from stage (a) would be resin having low density range. This is to improve the physical properties of finally produced resin by synthesizing resin with uniform copolymerization comonomer distribution in the polymer chain by means of transition metal catalyst with single site, differently from Ziegler-Natta catalyst which provides heterogeneous copolymer distribution in the polymer chain.

On the other hand, the polymer prepared from stage (b) is contained in an amount of 30~90% by weight, more preferably 40~80% by weight. If the polymer content from stage (b) is lower than 30% by weight, processibility of final resin (owing to the high molecular weight, low density ethylene copolymer prepared from stage (a)) and transparency of the film become poor. If the content exceeds 90% by weight, content of the polymer prepared from stage (a) (which provides good physical properties) becomes low, thereby resulting in lowered environmental resistance, impact strength, tensile strength of the resin.

Molecular weight of the polymer prepared from stage (b), which is based on measurement of MI (melt index) according to ASTM D2839, is MI of 0.1 to 100.0 g/10 min, more preferably from 0.3 to 50.0 g/10 min. If MI of the polymer prepared from stage (b) is less than 0.1 g/10 min, the molecular weight range is overlapped with the polymer prepared from stage (a), so that the molecular weight distribution would not be broad enough to achieve advantage of multi-stage reaction. If it exceeds 100 g/10 min, the physical properties would become poor because of low molecular weight.

Density of the polymer produced from stage (b) is preferably from 0.900 to 0.970 g/cm$^3$. If the density is lower than 0.900 g/cm$^3$, the density is covered by the density range of the polymer prepared from stage (a), so that the effect of stepwise polymerization would be eliminated. If it exceeds 0.970 cm³, it would be troublesome because the film prepared therefrom is too stiff. Thus, the density range of the polymer prepared from stage (a) and that of the polymer from stage (b) should be adjusted to optimize the physical properties of the resin.

The ethylene copolymer prepared according to the inventive process include linear low density polyethylene copolymer (LLDPE) having the density of 0.910~0.940 g/cm³, and very low density polyethylene copolymer (VLDPE or ULDPE) having the density of 0.900~0.910 g/cm³.

The ethylene copolymer prepared according to the inventive process has the molecular weight distribution index of 2.8~30.0.

The present invention is designed to improve processibility of ethylene copolymer prepared by using conventional single site catalyst (characterized by narrow molecular weight distribution), due to at least bimodal molecular weight distribution of the polymer through the multi-stage reaction process. For this, the molecular weight distribution index (weight average molecular weight divided by number average molecular weight) of the ethylene copolymer prepared by using the process and catalyst according to the invention is controlled to be in the range from 2.8 to 30.0, in order to improve processibility as well as physical properties.

Thus, the ethylene copolymers prepared through stage (a) and (b) described above may be those having the molecular weight distribution index of 2.8~3.0, preferably 3.0~20. When the molecular weight distribution index is within the range, processibility or physical properties of ethylene copolymer can be suitably controlled as desired. If the molecular weight distribution index is less than 2.8, there would be no significant difference when using a single reactor and single site catalyst. If it exceeds 30.0, effect of controlling density and molecular weight distribution index disappears to result in poor improvement in processibility or physical properties.

According to the present invention, ethylene and C3-C18 α-olefin comonomer (which are fed to stage (a) or (b)) are dissolved in solvent before being fed to the reactor. Before mixing and dissolving, ethylene, comonomer and solvent are subjected to purification process to remove impurities including moisture, oxygen, carbon monoxide and other metallic impurities (which may act as potential catalyst poison). Substances to be used in such purification include molecular sieves, activated aluminum, and silica gel as well known in the corresponding field.

The substances to be incorporated to stage (a) and (b) are cooled or heated through heat exchange process before feeding. The temperature inside the reactor is controlled through this process. Thus, temperature control of the reactor is an adiabatic reactor process without heat exchange through the reactor wall. Control of reaction heat alters the temperature of solvent stream into the reactor and that of the monomer flow.

After stage (b), ethylene, comonomer, catalyst or solvent may be additionally fed according to the invention. Temperature of these components is also controlled to predetermined temperature via heat exchange. In general, catalyst is fed separately from other substances, preferably being previously mixed or dissolved with/in solvent.

Molecular weight and density of the stage are analyzed after stage (b) [when the polymer is prepared via two- or multi-stage reaction]; or physical properties of polymers prepared via further stages are analyzed by sampling the resin after stage (a), and those of finally produced polymer after stage (b) are analyzed, so that density, molecular weight of the polymers, and the like are calculated in every stage. For measuring physical properties, they can be analogized by the physical properties of the polymer obtained by carrying out the reaction of each stage in a single reactor under identical polymerization condition (such as temperature and pressure, solvent, reactants, catalyst and reaction time). Otherwise, physical properties of the polymer synthesized in each stage can be analyzed by sampling and analyzing samples in the reactor of each stage in the multi-stage reaction. In the meanwhile, residence time in stage (a) or (b) is determined by the designed volume and output per time for each stage. In order to maintain the operation condition with homogeneity of the substances, appropriate stirring is required for stage (a) and (b). Finally prepared ethylene polymer or ethylene copolymer is recovered through appropriate process for removing solvent.

ADVANTAGEOUS EFFECTS

The ethylene copolymers having multi-modal molecular weight distribution according to the present invention, which is prepared via multi-stage synthesis of ethylene or α-olefin, show the effect of improved physical properties as well as processibility.

The process according to the invention provides high productivity and various usage with overcoming the disadvantages resulted from blending with other polymer(s).

From the ethylene copolymers prepared via stages (a) and (b), obtained can be molded articles used as blown film, casting film, injection molding, blow molding or pipe.

The film can be formed as blown film or casting film to provide mono-layer or multi-layer film for package. They can be applied to the use for shrinkage film, film for heavy package, film for freeze package, film for automatic package, stretch wrap, bags, or the like.

DESCRIPTION OF DRAWINGS

The above and other objects, features and advantages of the present invention will become apparent from the following description of preferred embodiments given in conjunction with the accompanying drawings.

DETAILED DESCRIPTION OF MAIN ELEMENTS

Figure 1:
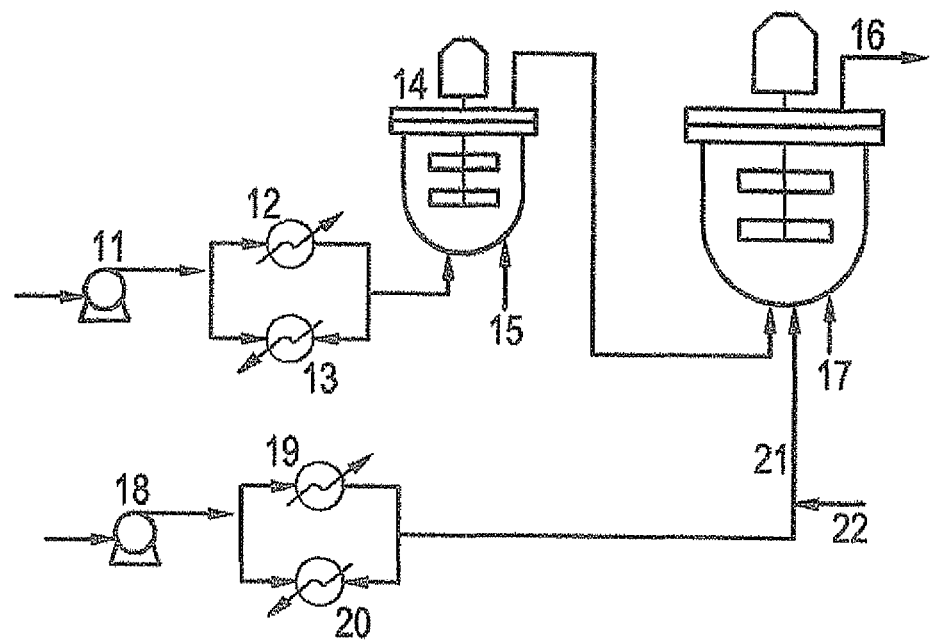
FIG. 1 is a schematic view of reactors in series in accordance with a preferable embodiment of the present invention.
Figure 2:
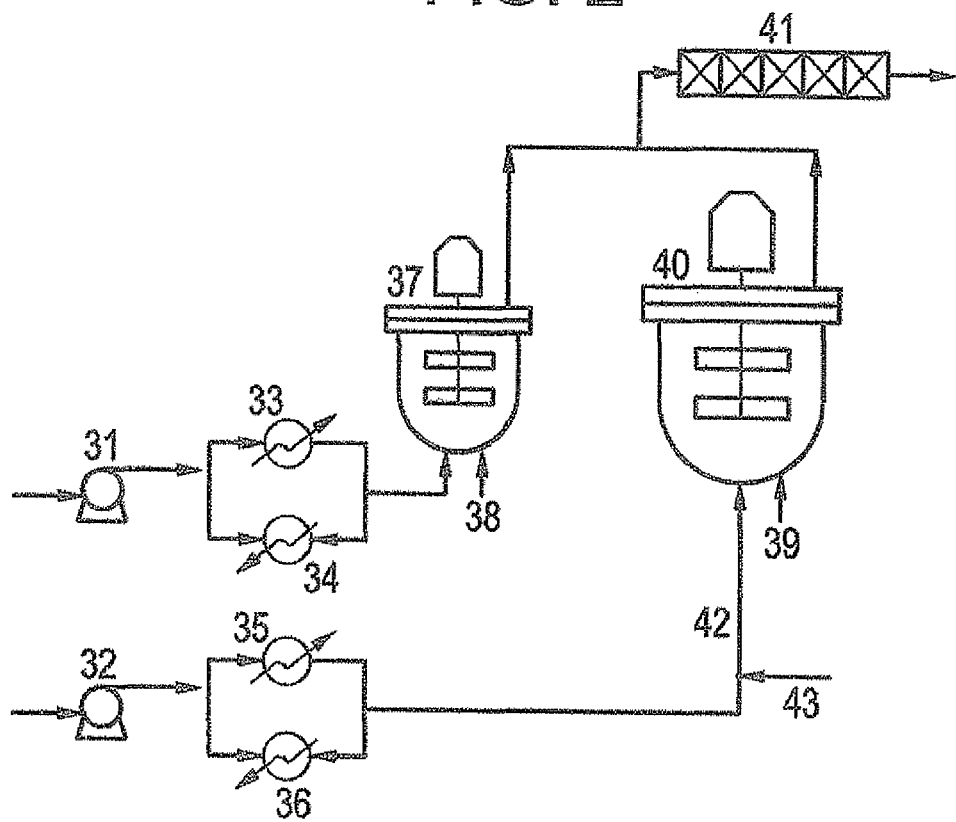
FIG. 2 is a schematic view of reactors in parallel in accordance with a preferable embodiment of the present invention.

11: feed pump of stage-1 reactor
12: feed cooler of stage-1 reactor
13: feed heater of stage-1 reactor
14: stage-1 low-temperature reactor
15: catalyst feed of stage-1 low-temperature reactor
16: stage-2 high-temperature reactor connected in series
17: catalyst feed of stage-2 high-temperature reactor
18: feed pump of stage-2 reactor
19: feed cooler of stage-2 reactor
20: feed heater of stage-2 reactor
21: feed of stage-2 reactor
22: hydrogen feed
31: feed pump of low-temperature reactor
32: feed pump of high-temperature reactor
33: feed cooler of low-temperature reactor
34: feed heater of low-temperature reactor 35: feed cooler of high-temperature reactor
36: feed heater of high-temperature reactor
37: low-temperature reactor
38: catalyst feed of low-temperature reactor
39: catalyst feed of high-temperature reactor
40: high-temperature reactor
41: in-line mixer
42: feed of stage-2 reactor
43: hydrogen feed

BEST MODE

Hereinafter, the present invention will be described in detail with reference to Examples, which are not intended to restrict the scope of the invention.

Unless being stated otherwise, all experiments for synthesizing the ligands and catalysts were carried out under nitrogen atmosphere with standard Schlenk or glove-box technique, and the organic solvents were used after they had been dried via reflux over sodium metal and benzophenone, and then distilled immediately before use. $^1$H-NMR analyses of the ligands and catalysts thus synthesized were performed by using Varian Mercury 300 MHz Spectrometer at ambient temperature.

As the solvent for polymerization, cyclohexane was passed through a tube filled with Q-5 catalyst (from BASF), silica gel and activated alumina, sequentially, and bubbled by nitrogen with high purity to sufficiently remove moisture, oxygen and other catalyst poison.

By using the polymer thus obtained, prepared was film processed with a blown film molding device and casting molding device. The polymers and film thus obtained were analyzed by the methods described below.

1. Melt Flow Index (MI)
MI was measured according to ASTM D 2839.
2. Density
Density was measured by using density gradient column, according to ASTM D 1505.
3. Analysis of Melting Temperature (Tm)
Tm was measured under $2^{nd}$ heating condition at a rate of 10° C./min in the presence of nitrogen atmosphere, by means of Dupont DSC2910.
4. Molecular Weight and Molecular Weight Distribution
Molecular weight was measured at 135° C. at a rate of 1.0 mL/min in the presence of 1,2,3-trichlorobenzene solvent by using PL210 GPC equipped with PL Mixed-BX2+preCol. Molecular weight was calibrated by using PL polystyrene standards.
5. Tensile Strength
Tensile strength was measured according to ASTM D638.
6. Impact Strength
Impact strength was measured according to ASTM D1709.
7. Haze
Haze was measured according to ASTM D1003.
8. Heat Seal
Ethylene copolymers obtained from Examples and Comparative Examples were processed into film. Two sheets of the film are overlapped and adhered under a pressure of 2 kg/cm$^2$ for 1 second at a certain temperature. Tensile strength of the adhered sample was measured. If it is not less than 1,500 g, the temperature at the adhesion was determined as the heat seal. Thus, the lower the value, the less energy consumed, with showing high strength at the time of use after adhering process.

9. Processing Load
While a product is processed by means of an extruder with 35 mm of diameter, current value applied to the extruder motor was measured as the processing load.
10. Physical Property of Pipe
In order to determine suitability and advantage of the produced resin for use as pipe, the resin was processed into pipe (outer diameter=16 mm, thickness=1.45 mm), and resistance to slow crack growth was measured according to ISO 13479.

All procedures relevant to Examples were carried out by means of continuous solution polymerization process as described below. In the process, flow of any solvent, monomer, catalyst, or the like was continuously provided. The reaction products including polymers, isolated solvent and unreacted substances were also removed continuously. All feed flows were passed through conventionally known adsorption media before being fed into the reactor to increase purity. During this procedure, impurities (water, oxygen, carbon monoxide, or the like) as catalyst poison are removed. All starting materials are stored and used under nitrogen atmosphere of high purity.

The polymerization process according to the invention is carried out in two reactors sequentially connected in series, or in two reactors connected in parallel. In case of connection in series, a first reactor has inner volume of 500 mL, and sequentially connected to a second reactor of volume of 1000 mL through pipe. In case of connection in parallel, a 500 mL reactor is connected to a 650 mL reactor. Each reactor is designed so that solvent, monomers, comonomers, hydrogen and catalyst may be fed into it.

Catalyst to be fed to the reactor according to the invention is catalyst composition containing single site catalyst represented by Chemical Formula (1), and the catalyst is commonly applied to reactions in the first and second stages of all Examples.

As cocatalyst, boron-containing ion activator and aluminoxane is used according to the present invention. Specifically, triisobutylaluminum was optionally used as aluminoxane, and triphenylmethyliniumtetrakispentafluorophenyl borate as ion activator, in the Examples. Catalyst and cocatalyst were fed to the first and second reactor as their solution dissolved in toluene.

The polymerization process according to the invention is carried out in cyclohexane solvent under pressure of 110 kg/cm$^2$. Ethylene is dissolved in cyclohexane, prior to be fed to the polymerization reactor, at a temperature of 23° C. under a pressure of 30 kg/cm$^2$. Comonomer, together with ethylene, is also dissolved in solvent prior to be fed to the polymerization reactor. As the reaction proceeds, ethylene conversion is controlled by means of catalyst concentration, reaction temperature, catalytic activity, and the like.

Preparation of Catalyst

Preparation Example 1

Synthesis of bis(2-phenyl-4-fluorophenoxy)(pentamethylcyclopentadienyl)titanium (IV) chloride In diethyl ether (80 mL), dissolved was 2-phenyl-4-fluorophenol (1.90 g, 10.09 mmol), and butyl lithium (4.8 mL) (in 2.5 M hexane) was slowly added dropwise thereto at 0° C. After reacting for 5 hours at ambient temperature, solution of (trichloro)(pentamethylcyclopentadienyl)titanium (IV) (1.64 g, 5.5 mmol) in 10 mL of diethyl ether was slowly added dropwise thereto at −78° C. The mixture was stirred at ambient temperature for 12 hours, and filtered and evaporated to remove volatiles. Recrystallization from toluene/hexane mixture at −35° C. gave orange solid (2.54 g).

Yield: 85%

$^1$H NMR ($C_6D_6$) δ=1.46 (s, 15H), 6.65~7.57 (m, 8H).

Preparation Example 2

Synthesis of bis(4-methyl-2-(2'-isopropylphenyl)phenoxy)(pentamethylcyclopentadienyl)titanium (IV) chloride In toluene (20 mL), dissolved were 4-methyl-2-(2'-isopropylphenyl)phenol (2 g, 8.8 mmol) and sodium hydride (636 mg, 26.5 mmol), and the mixture was reacted under reflux for 4 hours. Then the reaction mixture was cooled to ambient temperature, and solution of (pentamethylcyclopentadienyl)titanium (IV) trichloride (1.15 g, 4.0 mmol) dissolved in 5 mL of toluene was slowly added dropwise thereto. The resultant mixture was reacted under reflux for 24 hours. When the reaction was completed, volatile substances were removed and the residue was washed with purified hexane. Recrystallization from hexane at −35° C., and drying under reduced pressure gave orange solid (1.65 g).

Yield 61%

$^1$H NMR ($C_6D_6$) δ=0.96-1.07 (m, 6H), 1.54 (s, 15H), 1.72 (s, 3H), 2.76 (m, 1H), 6.76-7.27 (m, 7H) ppm Preparation Example 3

Synthesis of bis(2-phenylphenoxy)(pentamethylcyclopentadienyl)titanium (IV) chloride In a dry flask, 2-phenylphenol (1.72 g, 10.1 mmol, Aldrich 99%) was dissolved in 40 mL of toluene. The solution was cooled to 0° C. with thorough stirring, and n-butyllithium (4.8 mL, 2.5 M in hexane, Aldrich) was slowly added thereto. After maintaining the temperature for 1 hour, solution of pentamethylcylcopentadienyl titanium trichloride (1.64 g, 55 mmol) dissolved in 10 mL of toluene was slowly added thereto. After maintaining the temperature for 1 hour, the temperature was raised to ambient temperature, and the reaction mixture was stirred for additional 1 hour. The temperature of the reactor was raised to 90° C., and reaction was carried out for 12 hours. The mixture was filtered, evaporated to remove volatiles, and recrystallized from toluene/hexane mixed solvent at −35° C. to obtain orange solid (2.3 g).

Yield: 75%

$^1$H NMR ($C_6D_6$) δ=1.54 (s, 15H), 6.74~7.16 (m, 9H) ppm

Preparation Example 4

Synthesis of 2-isopropyl-6-phenylphenol

In a flask charged with 2-bromo-6-isopropylanisole (1.98 g, 8.64 mmol), phenylboronic acid (2.10 g, 17.28 mmol), palladium acetate (96 mg, 0.43 mmol), triphenylphosphine (0.225 g, 0.86 mmol) and potassium phosphate (11 g, 51.84 mmol), mixture of water (8 mL) and dimethoxyethane (32 mL) was added, and the resultant mixture was heated under reflux for 12 hours. After cooling to ambient temperature, aqueous ammonium chloride (15 mL) and diethyl ether (30 mL) were charged thereto. The organic layer was isolated, and the residue was extracted with diethyl ether. Combined organic layer was dried over magnesium sulfate, and evaporated to remove the volatiles to obtain 2-isopropyl-6-phenylanisole as grey solid (2 g). The anisole obtained (without further purification) was dissolved in methylene chloride (15 mL), and 12 mL of boron tribromide solution (1 M in methylene chloride) was added dropwise thereto at −78° C. Reaction was carried out for 12 hours while slowly raising the temperature to ambient temperature. When the reaction was completed, mixture of water (15 mL) and diethyl ether (30 mL) was added thereto. After isolating the organic layer, the aqueous layer was extracted with diethyl ether (15 mL×3). The combined organic layer was dried, and evaporated under reduced pressure to remove the volatiles. The residue was purified via silica gel column by using mixed solvent of hexane and methylene chloride to obtain 2-isopropyl-6-phenylphenol (1.72 g) as white solid.

Yield: 94%

$^1$H-NMR ($CDCl_3$) δ=1.307 (d, 6H), 3.45 (m, 1H), 5.09 (s, 1H), 6.95-7.43 (m, 8H) ppm Synthesis of (dichloro)(pentamethylcyclopentadienyl)(2-isopropyl-6-phenylphenoxy)titanium (IV)

Solution of 2-isopropyl-6-phenylphenol (700 mg, 3.28 mmol) and sodium hydride (236 mg, 9.84 mmol) in toluene (10 mL) was subjected to reaction under reflux for 4 hours. Then, the mixture was cooled to ambient temperature, and solution of (trichloro)(pentamethylcyclopentadienyl)titanium (IV) (930 mg, 3.21 mmol) dissolved in toluene (5 mL) was slowly added dropwise thereto. The resultant mixture was reacted under reflux for 24 hours. When the reaction was completed, volatile substances were removed therefrom, and the residue was washed with purified hexane. Recrystallization from toluene/hexane mixed solvent at −35° C., followed by filtration and drying under reduced pressure gave red solid (1.0 g).

Yield: 64%

$^1$H-NMR ($C_6D_6$) δ=1.324 (d, 6H), 1.63 (s, 15H), 3.53 (m, 1H), 7.05-7.66 (m, 8H) ppm Preparation Example 5

Synthesis of 2-biphenylphenol

In a flask charged with 2-bromoanisole (1.62 g, 8-64 mmol), 4-biphenylboronic acid (2.57 g, 12.96 mmol), palladium acetate (96 mg, 0.43 mmol), triphenylphosphine (0.225 g, 0.86 mmol) and potassium phosphate (11 g, 51.84 mmol), mixture of water (8 mL) and dimethoxyethane (32 mL) was added, and the resultant mixture was heated under reflux for 12 hours. After cooling to ambient temperature, aqueous ammonium chloride (15 mL) and diethyl ether (30 mL) were charged thereto. The organic layer was isolated, and the residue was extracted with diethyl ether. Combined organic layer was dried over magnesium sulfate, and evaporated to remove the volatiles to obtain 2-biphenylanisole as grey solid (2.0 g). The anisole obtained (without further purification) was dissolved in methylene chloride (15 mL), and 12 mL of boron tribromide solution (1 M in methylene chloride) was added dropwise thereto at −78° C. Reaction was carried out for 12 hours while slowly raising the temperature to ambient temperature. When the reaction was completed, mixture of water (15 mL) and diethyl ether (30 mL) was added thereto. After isolating the organic layer, the aqueous layer was extracted with diethyl ether (15 mL×3). The combined organic layer was dried, and evaporated under reduced pressure to remove the volatiles. The residue was purified via silica gel column by using mixed solvent of hexane and methylene chloride to obtain 2-biphenylphenol (1.8 g) as white solid.

Yield: 85%

$^1$H-NMR ($CDCl_3$) δ=5.29 (s, 1H), 6.95-7.75 (m, 13H) ppm

Synthesis of (dichloro)(pentamethylcyclopentadienyl)(2-biphenylphenoxy)titanium (IV)

Solution of 2-biphenylphenol (700 mg, 2.84 mmol) and sodium hydride (204 mg, 8.52 mmol) in toluene (10 mL) was subjected to reaction under reflux for 4 hours. Then, the mixture was cooled to ambient temperature, and solution of (trichloro)(pentamethylcyclopentadienyl)titanium (IV) (820 mg, 2.83 mmol) dissolved in toluene (5 mL) was slowly added dropwise thereto. The resultant mixture was reacted under reflux for 24 hours. When the reaction was completed, volatile substances were removed therefrom, and the residue was washed with purified hexane. Recrystallization from toluene/hexane mixed solvent at −35° C., followed by filtration and drying under reduced pressure gave red solid (0.9 g).
Yield: 64%
$^1$H-NMR ($C_6D_6$) δ=1.65 (s, 15H), 6.65-7.89 (m, 13H) ppm Preparation Example 6

Synthesis of (dichloro)(pentamethylcyclopentadienyl)(2-9',9"-dimethylfluorene-2'-yl)phenoxy)titanium (IV)

Synthesis of 2-bromo-9,9'-dimethylfluorene

A 1000 mL three-necked round-bottomed flask was charged with 2-bromofluorene (25 g, 102.0 mmol), iodomethane (43.4 g, 306.0 mmol) and DMSO (300 mL), and the mixture was stirred under nitrogen atmosphere to obtain complete dissolution. Solution of potassium-tert-butoxide (32.1 g, 285.6 mmol) dissolved in DMSO (400 mL) was slowly added dropwise thereto. After stirring at ambient temperature for 12 hours, stirring was continued at 80° C. for 1 hour. The temperature was lowered again to ambient temperature, and the reaction mixture was mixed with water (1000 mL), and extracted with n-hexane. The organic mixture was washed three times with distilled water, and dried over anhydrous magnesium sulfate ($MgSO_4$) to remove moisture. After evaporation of solvent by using a rotary evaporator, the residue was purified via silica gel column chromatography by using n-hexane. Recrystallization from n-haxane gave 2-bromo-9,9'-dimethylfluorene (27.0 g, yield: 96.9%) as white solid.
$^1$H-NMR ($CDCl_3$) δ=1.65(s, 6H), 7.35-7.39(m, 2H), 7.44-7.50(m, 2H), 7.58-7.62(m, 2H), 7.72-7.73(m, 1H) ppm.

Synthesis of 2-(2"-methoxyphenyl)-9,9'-dimethylfluorene

In a flask charged with 2-bromo-9,9'-dimethylfluorene (27.0 g, 98.8 mmol), 2-methoxyphenylboronic acid (18.0 g, 118.6 mmol), palladium acetate (0.13 g, 0.6 mmol), triphenylphosphine (0.94 g, 3.6 mmol) and potassium phosphate (40.9 g, 177.9 mmol), mixture of water (70 mL) and dimethoxyethane (150 mL) was added, and the resultant mixture was heated under reflux for 6 hours. After cooling to ambient temperature, aqueous ammonium chloride (150 mL) and diethyl ether (200 mL) were charged thereto. The organic layer was isolated, and the residue was extracted with diethyl ether. Combined organic layer was dried over magnesium sulfate, and evaporated to remove the volatiles. Purification via silica gel column chromatography (eluent: hexane) gave 2-(2"-methoxyphenyl)-9,9'-dimethylfluorene (28.0 g, yield: 94.0%) as solid product.

$^1$H-NMR ($CDCl_3$) δ=1.56(s, 6H), 3.88(s, 3H), 7.04-7.06 (d, 1H), 7.08-7.11(t, 1H), 7.33-7.39(m, 3H), 7.43-7.45(d, 1H), 7.47-7.48(d, 1H), 7.56-7.58(d, 1H), 7.63(s, 1H), 7.76-7.840(t, 2H) ppm Synthesis of 2-(9',9"-dimethylfluoren-2'-yl)phenol In methylene chloride (400 mL), dissolved was 2-(2"-methoxyphenyl)-9,9'-dimethylfluorene (25.0 g, 83.2 mmol), and 100 mL of boron tribromide solution (1 M in methylene chloride) was added dropwise thereto at −78° C. Reaction was carried out for 3 hours while slowly raising the temperature to ambient temperature. When the reaction was completed, mixture of ice (150 g) and diethyl ether (300 mL) was added thereto. After isolating the organic layer, the aqueous layer was extracted with diethyl ether. The combined organic layer was dried over magnesium sulfate, and evaporated to remove the volatiles. The residue was purified via silica gel column chromatography by using mixed solvent of hexane and methylene chloride to obtain 2-(9', 9"-dimethylfluoren-2'-yl)phenol (18.0 g, yield: 75.5%) as white solid.
$^1$H-NMR ($CDCl_3$) δ=1.55(s, 6H), 7.04-7.07(m, 2H), 7.30-7.40(m, 4H), 7.47-7.50(m, 2H), 7.55(s, 1H); 7.78-7.80 (d, 1H), 7.85-7.87(d, 1H) ppm Synthesis of (dichloro) (pentamethylcyclopentadienyl)(2-(9',9"-dimethylfluoren-2'-yl)phenoxy)titanium (IV)

To solution of 2-(9',9-dimethylfluoren-2'-yl)phenol (5.0 g, 17.1 mmol) dissolved in 200 mL of toluene, n-butyllithium (2.5 M in hexane, 6.9 mL) was slowly injected at −78° C. After stirring the mixture at ambient temperature for 12 hours, the reaction mixture was chilled to −78° C., and solution of (pentamethylcyclopentadienyl)titanium(IV) trichloride (4.7 g, 16.3 mmol) dissolved in 100 mL of toluene was slowly added thereto, and the reaction was continued at ambient temperature for 12 hours. When the reaction was completed, the reaction mixture was filtered through celite, and the solvent was removed. Recrystallization from purified toluene and hexane at −35° C., followed by filtration and drying under reduced pressure gave (dichloro)(pentamethylcyclopentadienyl)(2-(9',9"-dimethylfluoren-2'-yl)phenoxy) titanium(IV) (5.6 g) (yield: 63.9%) as red solid.
$^1$H-NMR ($C_6D_6$) δ=1.61(s, 6H), 1.77(s, 15H), 7.03-7.05(t, 1H), 7.16-7.19(t, 1H), 7.32-7.34(m, 2H), 7.37-7.39(d, 1H), 7.42-7.44(d, 1H), 7.46-7.47(d, 1H), 7.71-7.77(m, 3H), 7.82-7.84(d, 1H) ppm
Mass (APCI mode, m/z): 539.4

Preparation Example 7

Synthesis of (chloro)(pentamethylcyclopentadienyl)(bis(2-(9',9"-dimethylfluoren-2'-yl)phenoxy))titanium(IV)

To solution of 2-(9',9"-dimethylfluoren-2'-yl)phenol (5.0 g, 17.1 mmol) dissolved in 200 mL of toluene, n-butyllithium (2.5 M in hexane, 6.9 mL) was slowly injected at −78° C. After stirring the mixture at ambient temperature for 12 hours, the reaction mixture was chilled to −78° C., and solution of (pentamethylcyclopentadienyl)titanium(IV) trichloride (2.3 g, 8.0 mmol) dissolved in 100 mL of toluene was slowly added thereto, and the reaction was continued at 80° C. for 12 hours. When the reaction was completed, the reaction mixture was filtered through celite, and the solvent was removed. Recrystallization from purified toluene and hexane at −35° C., followed by filtration and drying under reduced pressure gave (chloro)(pentamethylcyclopentadienyl)(bis(2-(9',9''-dimethylfluoren-2'-yl)phenoxy)titanium(IV) (3.5 g) (yield: 55.8%) as orange solid.

$^1$H-NMR (C$_6$D$_6$) δ=1.54(s, 6H), 1.61(s, 6H), 1.65(s, 15H), 7.01-7.04(t, 2H), 7.21-7.24(t, 2H), 7.33-7.36(m, 4H), 7.39-7.41(t, 4H), 7.44-7.46(m, 2H), 7.65(s, 2H), 7.73-7.757(t, 2H), 7.82-7.88(m, 4H) ppm Mass (APCI mode, m/z): 789.3

Preparation Example 8

Synthesis of (dichloro)(pentamethylcyclopentadienyl)(2-(9'H-fluoren-2'-yl)phenoxy)titanium(IV)

Synthesis of 2-(2'-methoxyphenyl)-9H-dimethylfluorene

In a flask charged with 2-bromo-9H-fluorene (10.0 g, 40.8 mmol), 2-methoxyphenylboronic acid (7.4 g, 49.0 mmol), palladium acetate (0.055 g, 0.245 mmol), triphenylphosphine (0.44 g, 1.4 mmol) and potassium phosphate (2.0 g, 95.5 mmol), mixture of water (33 mL) and dimethoxyethane (100 mL) was added, and the resultant mixture was heated under reflux for 6 hours. After cooling to ambient temperature, aqueous ammonium chloride (100 mL) and diethyl ether (150 mL) were charged thereto. The organic layer was isolated, and the residue was extracted with diethyl ether. Combined organic layer was dried over magnesium sulfate, and evaporated to remove the volatiles. Purification via silica gel column chromatography (eluent: hexane) gave 2-(2'-methoxyphenyl)-9H-dimethylfluorene (10.0 g, yield: 90.0%) as solid product.

$^1$H-NMR (CDCl$_3$) δ=3.87(s, 3H), 3.98(s, 2H), 7.04-7.05 (d, 1H), 7.07-7.10(t, 1H), 7.32-7.42(m, 4H), 7.57-7.59(d, 2H), 7.74(s, 1H), 7.83-7.86(t, 2H) ppm Synthesis of 2-(9'H-fluoren-2'-yl)phenol In methylene chloride (200 mL), dissolved was 2-(2'-methoxyphenyl)-9H-dimethylfluorene (10.0 g, 36.7 mmol), and 44 mL of boron tribromide solution (1 M in methylene chloride) was added dropwise thereto at −78° C. Reaction was carried out for 3 hours while slowly raising the temperature to ambient temperature. When the reaction was completed, mixture of ice (150 g) and diethyl ether (200 mL) was added thereto. After isolating the organic layer, the aqueous layer was extracted with diethyl ether. The combined organic layer was dried over magnesium sulfate, and evaporated to remove the volatiles. The residue was purified via silica gel column chromatography by using mixed solvent of hexane and methylene chloride to obtain 2-(9'H-fluoren-2'-yl)phenol (7.0 g, yield: 73.8%) as white product.

$^1$H-NMR (CDCl$_3$) δ=3.96(s, 2H), 7.00-7.02(m, 2H), 7.25-7.35(m, 3H), 7.39-7.42(t, 1H), 7.47-7.49(d, 1H), 7.56-7.58(d, 1H), 7.64(s, 1H), 7.81-7.83(d, 1H), 7.88-7.89(d, 1H) ppm Synthesis of (dichloro) (pentamethylcyclopentadienyl)(2-(9'H-fluoren-2'-yl)phenoxy)titanium(IV)

To solution of 2-(9'H-fluoren-2'-yl)phenol (4.4 g, 17.0 mmol) dissolved in 200 mL of toluene, n-butyllithium (2.5 M in hexane, 6.9 mL) was slowly injected at −78° C. After stirring the mixture at ambient temperature for 12 hours, the reaction mixture was chilled to −78° C., and solution of (pentamethylcyclopentadienyl)titanium(IV) trichloride (4.7 g, 16.3 mmol) dissolved in 100 mL of toluene was slowly added thereto, and the reaction was continued at ambient temperature for 12 hours. When the reaction was completed, the reaction mixture was filtered through celite, and the solvent was removed. Recrystallization from purified toluene and hexane at −35° C., followed by filtration and drying under reduced pressure gave (dichloro)(pentamethylcyclopentadienyl)(2-(9'H-fluoren-2'-yl)phenoxy)titanium(IV) (5.9 g)(yield: 71.0%) as red solid.

$^1$H-NMR (C$_6$D$_6$) δ=1.72(s, 15H), 3.94(s, 2H), 7.05-7.18 (m, 2H), 7.36-7.38(m, 2H), 7.44-7.46(m, 2H), 7.48-7.50(d, 1H), 7.65-7.66(d, 1H), 7.81-7.82(d, 1H), 7.86-7.87(d, 1H), 7.98(1, 1H) ppm Mass (APCI mode, m/z): 511.3

Preparation Example 9

Synthesis of (dichloro)(pentamethylcyclopentadienyl)(1-phenylnaphthalen-2-yloxy)titanium(IV)

Synthesis of 1-bromo-2-methoxynaphthalene

A 500 mL three-necked round-bottomed flask was charged with 1-bromonaphthalen-2-ol (30.0 g, 134.5 mmol), potassium hydroxide (KOH) (11.3 g, 201.7 mmol) and DMSO (300 mL), and the mixture was stirred under nitrogen atmosphere for 10 minutes, After cooling the mixture by using ice-water bath, iodomethane (28.6 g, 201.7 mmol) was slowly added dropwise thereto. Then, the resultant mixture was stirred under nitrogen atmosphere at ambient temperature for 12 hours, and then at 50° C. for 1 hour. After cooling to ambient temperature, the reaction mixture was mixed with water (500 mL), and extracted with diethyl ether. Organic mixture was washed three times with distilled water, and dried over anhydrous magnesium sulfate (MgSO$_4$). After removing the solvent by using a rotary evaporator, the residue was purified via silica gel column chromatography (eluent: n-hexane) to obtain 1-bromo-2-methoxynaphthalene (22.0 g, yield: 69.0%) as white solid.

$^1$H-NMR (CDCl$_3$) δ=4.07(s, 3H), 7.30-7.32(d, 1H), 7.41-7.44(t, 1H), 7.58-7.61(t, 1H), 7.81-7.86(m, 2H), 8.25-8.26(d, 1H) ppm Synthesis of 2-methoxy-1-phenylnaphthalene In a flask charged with 1-bromo-2-methoxynaphthalene (20.0 g, 84.4 mmol), phenylboronic acid (11.3 g, 92.8 mmol), palladium acetate (0.10 g, 0.46 mmol), triphenylphosphine (0.85 g, 2.78 mmol) and potassium phosphate (40.9 g, 177.9 mmol), mixture of water (60 mL) and dimethoxyethane (120 mL) was added, and the resultant mixture was heated under reflux for 6 hours. After cooling to ambient temperature, aqueous ammonium chloride (150 mL) and diethyl ether (200 mL) were charged thereto. The organic layer was isolated, and the residue was extracted with diethyl ether. Combined organic layer was dried over magnesium sulfate, and evaporated to remove the volatiles. Purification via silica gel column chromatography (eluent: hexane) gave 2-methoxy-1-phenylnaphthalene (13.0 g, yield: 66%) as colorless liquid.

$^1$H-NMR (CDCl$_3$) δ=3.87(s, 3H), 7.35-7.47(m, 6H), 7.52-7.55(m, 3H), 7.85-7.87(d, 1H), 7.91-7.93(d, 1H) ppm Synthesis of 1-phenylnaphthalen-2-ol In methylene chloride (300 mL), dissolved was 2-methoxy-1-phenylnaphthalene (13.0 g, 55.5 mmol), and 670 mL of boron tribromide solution (1 M in methylene chloride) was added dropwise thereto at −78° C. Reaction was carried out for 3 hours while slowly raising the temperature to ambient temperature. When the reaction was completed, mixture of ice (150 g) and diethyl ether (250 mL) was added thereto. After isolating the organic layer, the aqueous layer was extracted with diethyl ether. The combined organic layer was dried over magnesium sulfate, and evaporated to remove the volatiles. The residue was purified via silica gel column chromatography by using mixed solvent of hexane and methylene chloride to obtain 1-phenylnaphthalen-2-ol (10.0 g, yield: 81.8%) as white solid.

$^1$H-NMR (CDCl$_3$) δ=7.29-7.31(d, 1H), 7.35-7.39(m, 2H), 7.53-7.56(t, 1H), 7.61-7.64(t, 2H), 7.83-7.86(m, 2H) ppm Synthesis of (dichloro)(pentamethylcyclopentadienyl)(1-phenylnaphthalen-2-yloxy)titanium (IV)

To solution of 1-phenylnaphthalen-2-ol (2.0 g, 9.1 mmol) dissolved in 100 mL of toluene, n-butyllithium (2.5 M in hexane, 3.6 mL) was slowly injected at −78° C. After stirring the mixture at ambient temperature for 12 hours, the reaction mixture was chilled to −78° C., and solution of (pentamethylcyclopentadienyl)titanium(IV) trichloride (2.5 g, 16.3 mmol) dissolved in 60 mL of toluene was slowly added thereto, and the reaction was continued at ambient temperature for 12 hours. When the reaction was completed, the reaction mixture was filtered through celite, and the solvent was removed. Recrystallization from purified toluene and hexane at −35° C., followed by filtration and drying under reduced pressure gave (dichloro) (pentamethylcyclopentadienyl) (1-phenylnaphthalen-2-yloxy)titanium(IV) (2.5 g) (yield: 58.2%) as red solid.

$^1$H-NMR (C$_6$D$_6$) δ=1.87(s, 15H), 7.27-7.32(m, 3H), 7.43-7.46(t, 2H), 7.58-7.60(m, 3H), 7.70-7.73(t, 1H), 7.92-7.94(t, 1H) ppm Mass (APCI mode, m/z): 471.83

Example 1

As single site catalyst for stage-1 and stage-2 reactors connected in series, employed was bis(pentamethylcyclopentadienyl) (2-phenyl-4-fluorophenoxy)titanium(IV) chloride prepared from Preparation Example 1. The amounts of catalyst used in Examples and Comparative Examples are shown in Table 1 and 2. Ti represents single site catalyst, Al represents triisobutylaluminum as cocatalyst, and B represents triphenylmethyliniumtetrakispentafluorophenyl borate. Each catalyst was dissolved in xylene at a concentration of 0.2 g/L, 5.0 g/L or 1.5 g/L. For each reactor, ethylene feed ratio was 4:6, and 1-octene was used as comonomer. However, the amount of ethylene to be fed to the stage-2 reactor should be determined, when the conversion is low, as considering the amount of unreacted ethylene flowing into the second reactor, in order to adjust the polymer density and molecular weight from the first reactor. Conversion of each reactor can be estimated for individual reaction condition, through the reaction condition for polymerizing one type of polymer, and temperature gradient in the reactor. In order to produce copolymer with relatively high MI in the second reactor, an appropriate amount of hydrogen was injected to control the molecular weight. Furthermore, molecular weight from each reactor may be controlled as a function of the reactor temperature and 1-octene content, of which the conditions are shown in Table 1-1.

The ethylene copolymer thus prepared was extruded at barrel temperature of 160-170-170° C., and die temperature of 175° C., to prepare blown film having thickness of 40 μm and width of 530 μm.

Example 2

Polymer was prepared in accordance with the procedure described in Example 1, but bis(2-phenylphenoxy)(pentamethylcyclopentadienyl)titanium(IV) chloride synthesized from Preparation Example 3 dissolved in toluene at a concentration of 0.2 g/L was incorporated as single site catalyst (the amount is shown in Table 1). Under the conditions listed in Table 1-1, the polymer was produced with different amount of ethylene to be fed to each reactor, amount of 1-octene as comonomer, and temperature of reactors.

Figure 3:
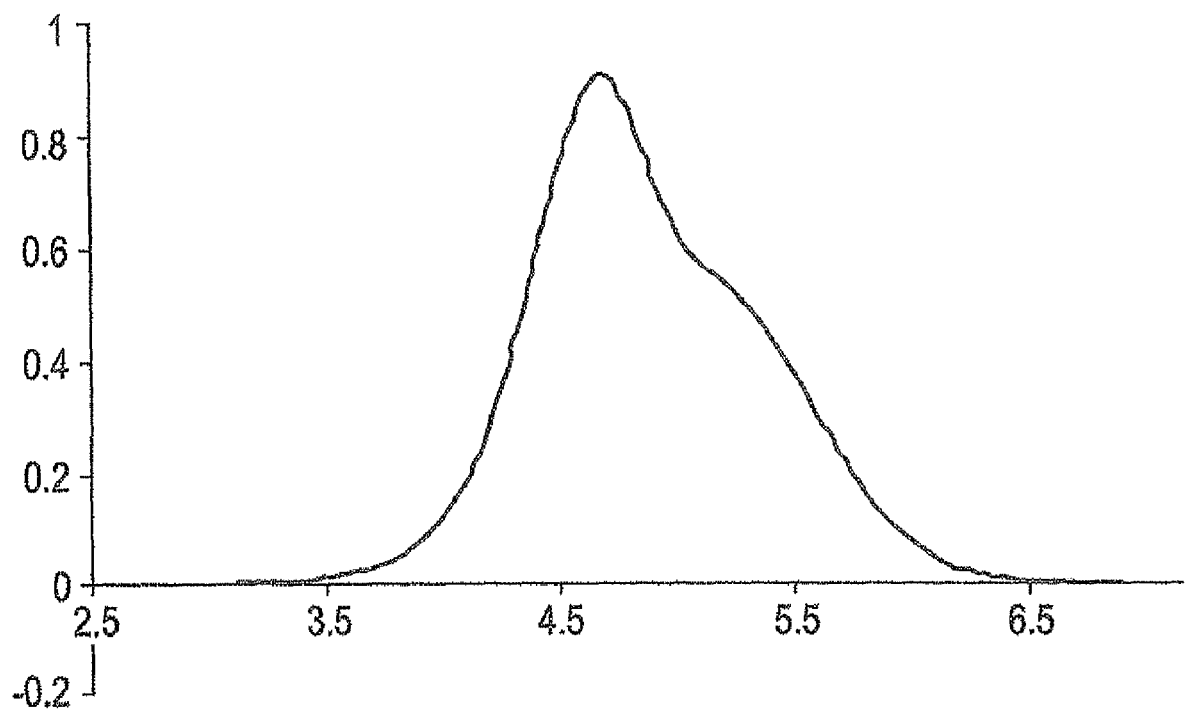
FIG. 3 shows the molecular weight distribution curve of ethylene copolymer in accordance with Example 2 of the present invention.

FIG. 3 is a molecular weight distribution curve of ethylene copolymers in accordance with Example 2 of the present invention. As referring to FIG. 3, it is confirmed that the polymer has broad molecular weight distribution since the molecular weight distribution curve of ethylene copolymer in accordance with Example 2 of the invention shows bimodal peaks (3.58).

The ethylene copolymer thus obtained was prepared as blown film under the same condition as in Example 1.

Example 3

Reaction was carried out by using two reactors connected in parallel. Solution of polymer and solvent from each reactor was homogeneously mixed via an in-line mixer to prepare the polymer product. Bis(4-methyl-2-(2'-isopropylphenyl)phenoxy)(pentamethylcyclopentadienyl)titanium(IV) chloride synthesized from Preparation Example 2 dissolved in toluene at a concentration of 0.2 g/L was added in an amount shown in Table 1-1, as single site catalyst. The polymer was prepared by using different amount of ethylene fed to each reactor, amount of 1-octene as comonomer, and temperature condition of the reactor, as listed in Table 1-1.

The ethylene copolymer thus obtained was prepared as blown film under the same condition as in Example 1.

Example 4

Polymer was prepared in accordance with the procedure described in Example 3, but the amounts of single site catalyst fed to the first and second reactors are as given in Table 1-1. The polymer was prepared with different amounts of ethylene and 1-octene as comonomer, and temperature condition of the reactor, as listed in Table 1-1.

The ethylene copolymer thus prepared was extruded at barrel temperature of 160-180-200° C., and die temperature of 230° C. via film casting method, to prepare casting film having thickness of 40 μm and width of 445 μm.

Example 5

Polymer was prepared in accordance with the procedure described in Example 1, but (dichloro) (pentamethylcyclopentadienyl)(2-isopropyl-6-phenylphenoxy)titanium(IV) synthesized from Preparation Example 4 dissolved in toluene at a concentration of 0.2 g/L was incorporated to the first and second reactors as single site catalyst (the amounts are shown in Table 1-1). Under the conditions listed in Table 1-1, the polymer was produced with different amount of ethylene to be fed to each reactor, amount of 1-octene as comonomer, and temperature condition of reactors.

The ethylene copolymer thus obtained was prepared as casting film under the same condition as in Example 4.

Example 6

Polymer was prepared in accordance with the procedure described in Example 3, but (dichloro) (pentamethylcyclopentadienyl)(2-biphenylphenoxy)titanium(IV) synthesized from Preparation Example 5 dissolved in toluene at a concentration of 0.2 g/L was incorporated to the first and second reactors as single site catalyst (the amounts are shown in Table 1-1). Under the conditions listed in Table 1-1, the polymer was produced with different amount of ethylene to be fed to each reactor, amount of 1-octene as comonomer, and temperature condition of reactors.

The ethylene copolymer thus obtained was prepared as casting film under the same condition as in Example 4.

Example 7

Polymer was prepared in accordance with the procedure described in Example 1, but bis(2-phenylphenoxy) (pentamethylcyclopentadienyl)titanium(IV) chloride synthesized from Preparation Example 3 dissolved in toluene at a concentration of 0.2 g/L was incorporated to the first and second reactors as single site catalyst (the amounts are shown in Table 1-1). Under the conditions listed in Table 1-1, the polymer was produced with different amount of ethylene to be fed to each reactor, amount of 1-octene as comonomer, and temperature condition of reactors.

The ethylene copolymer thus obtained was extruded by using a pipe extruder at the barrel temperature of 160-200-220° C. and die temperature of 230° C. at the line speed of 5 m/min to obtain pipe having outer diameter of 16 mm and thickness of 1.45 mm.

Example 8

Polymer was prepared in accordance with the procedure described in Example 1, but (dichloro) (pentamethylcyclopentadienyl)(2-(9'9"-dimethylfluoren-2'-yl)phenoxy)titanium(IV) synthesized from Preparation Example 6 dissolved in toluene at a concentration of 0.2 g/L was incorporated to the first and second reactors as single site catalyst (the amounts are shown in Table 1-2). Under the conditions listed in Table 1-2, the polymer was produced with different amount of ethylene to be fed to each reactor, amount of 1-octene as comonomer, and temperature condition of reactors.

The ethylene copolymer thus obtained was prepared as casting film under the same condition as in Example 4.

Example 9

Polymer was prepared in accordance with the procedure described in Example 1, but (chloro) (pentamethylcyclopentadienyl)(bis(2-(9'9"-dimethylfluoren-2'-yl)phenoxy)titanium(IV) synthesized from Preparation Example 7 dissolved in toluene at a concentration of 0.2 g/L was incorporated to the first and second reactors as single site catalyst (the amounts are shown in Table 1-2). Under the conditions listed in Table 1-2, the polymer was produced with different amount of ethylene to be fed to each reactor, amount of 1-octene as comonomer, and temperature condition of reactors.

The ethylene copolymer thus obtained was prepared as casting film under the same condition as in Example 4.

Example 10

Polymer was prepared in accordance with the procedure described in Example 1, but (dichloro) (pentamethylcyclopentadienyl)(2-(9'H-fluoren-2'-yl)phenoxy)titanium(IV) synthesized from Preparation Example 8 dissolved in toluene at a concentration of 0.2 g/L was incorporated to the first and second reactors as single site catalyst (the amounts are shown in Table 1-2). Under the conditions listed in Table 1-2, the polymer was produced with different amount of ethylene to be fed to each reactor, amount of 1-octene as comonomer, and temperature condition of reactors.

The ethylene copolymer thus obtained was prepared as casting film under the same condition as in Example 4.

Example 11

Polymer was prepared in accordance with the procedure described in Example 1, but (dichloro) (pentamethylcyclopentadienyl)(1-phenylnaphthalen-2-yloxy)titanium(IV) synthesized from Preparation Example 9 dissolved in toluene at a concentration of 0.2 g/L was incorporated to the first and second reactors as single site catalyst (the amounts are shown in Table 1-2). Under the conditions listed in Table 1-2, the polymer was produced with different amount of ethylene to be fed to each reactor, amount of 1-octene as comonomer, and temperature condition of reactors.

The ethylene copolymer thus obtained was prepared as casting film under the same condition as in Example 4.

Comparative Example 1

Polymer was prepared in a single reactor, and bis(4-methyl-2-(2'-isopropylphenyl)phenoxy)(pentamethylcyclopentadienyl)titanium(IV) chloride synthesized from Preparation Example 2 dissolved in toluene at a concentration of 0.2 g/L was used as single site catalyst (the amounts are shown in Table 2). Under the conditions listed in Table 2, the polymer was produced with different amount of ethylene to be fed to the reactor, amount of 1-octene as comonomer, and temperature condition of reactors. Physical properties, which were measured after processing the copolymer into film, just as for the copolymers produced in Examples 1 to 3, are shown in Table 3.

Comparative Example 2

Polymer was prepared in accordance with the procedure described in Example 1, but (trimethyl) (pentamethylcyclopentadienyltitanium(IV) dissolved in toluene at a concentration of 0.5 mol/mL was used for the first and second reactors as single site catalyst (the amounts are shown in Table 2). Under the conditions listed in Table 2, the polymer was produced with different amount of ethylene to be fed to each reactor, amount of 1-octene as comonomer, and temperature condition of reactors.

Physical properties, which were measured after processing the copolymer into film, just as for the copolymers produced in Examples 1 to 3, are shown in Table 3.

Comparative Example 3

Copolymer with 1-octene having monomodal molecular weight distribution (FT810 Grade commercially available from SK Energy) Physical properties, which were measured after processing the copolymer into film, just as for the copolymers produced in Examples 1 to 3, are shown in Table 3.

Comparative Example 4

Copolymer with 1-octene having monomodal molecular weight distribution (FT810 Grade commercially available from SK Energy). Physical properties, which were measured after processing the copolymer into film, just as for the copolymers produced in Examples 4 and 5, are shown in Table 3.

Comparative Example 5

Copolymer with 1-octene having monomodal molecular weight distribution (DX800 Grade commercially available from SK Energy). Physical properties, which were measured after processing the copolymer into pipe, just as for the copolymers produced in Example 6, are shown in Table 3.

TABLE 1-1

|  |  | Ex. 1 | Ex. 2 | Ex. 3 | Ex. 4 | Ex. 5 | Ex. 6 | Ex. 7 |
|---|---|---|---|---|---|---|---|---|
| Total flow of solution (kg/h) |  | 10.9 | 10.9 | 10.9 | 10.9 | 10.9 | 10.9 | 10.9 |
| Ethylene ratio |  | 4:6 | 4.5:5.5 | 3.4:6.6 | 3.5:6.5 | 2.5:7.5 | 4:6 | 4:6 |
| Ratio of 1-octene | $1^{st}$ Reactor | 0.45 | 0.30 | 0.24 | 0.34 | 0.19 | 0.24 | 0.11 |
| to ethylene | $2^{nd}$ Reactor | 0.10 | 0.09 | 0.12 | 0.11 | 0.14 | 0.11 | 0.04 |
| Amount of Ti | $1^{st}$ Reactor | 2.8 | 2.5 | 2.9 | 2.6 | 2.2 | 2.3 | 3.2 |
| (μmol/kg) | $2^{nd}$ Reactor | 7.5 | 8.1 | 7.7 | 8.0 | 7.5 | 7.7 | 8.7 |
| Al/Ti ratio |  | 80 | 80 | 80 | 80 | 80 | 80 | 80 |
| B/Ti ratio |  | 3 | 3 | 3 | 3 | 3 | 2.5 | 3 |
| Hydrogen feed to $2^{nd}$ reactor (ppm) |  | 3 | 7 | 3 | 7 | 6 | 9 | 8 |
| Reaction | $1^{st}$ Reactor | 107 | 105 | 109 | 103 | 109 | 107 | 112 |
| temperature | $2^{nd}$ Reactor | 160 | 165 | 162 | 165 | 161 | 165 | 163 |
| Polymer from | MI | 0.05 | 0.02 | 0.06 | 0.06 | 0.02 | 0.04 | 0.01 |
| $1^{st}$ Reactor | Density | 0.891 | 0.899 | 0.906 | 0.897 | 0.911 | 0.905 | 0.925 |
| Polymer from | MI | 0.99 | 1.01 | 0.99 | 2.70 | 2.99 | 3.15 | 0.71 |
| $2^{nd}$ Reactor | Density | 0.919 | 0.918 | 0.918 | 0.918 | 0.918 | 0.916 | 0.938 |
| GPC of final | Number average MW | 27800 | 26500 | 26900 | 24000 | 23700 | 21400 | 40000 |
| ethylene copolymer | Weight average MW | 90900 | 94900 | 88800 | 81200 | 88200 | 73600 | 142000 |
|  | MW distribution index | 3.27 | 3.58 | 3.30 | 3.38 | 3.72 | 3.43 | 3.55 |

TABLE 1-2

|  |  | Ex. 8 | Ex. 9 | Ex. 10 | Ex. 11 |
|---|---|---|---|---|---|
| Total flow of solution (kg/h) |  | 10.9 | 10.9 | 10.9 | 10.9 |
| Ethylene ratio |  | 4:6 | 4.5:5.5 | 3.5:6.5 | 4:6 |
| Ratio of 1-octene | $1^{st}$ Reactor | 0.27 | 0.24 | 0.29 | 0.21 |
| to ethylene | $2^{nd}$ Reactor | 0.11 | 0.13 | 0.08 | 0.14 |
| Amount of Ti | $1^{st}$ Reactor | 1.1 | 3.4 | 2.5 | 3.5 |
| (μmol/kg) | $2^{nd}$ Reactor | 6.1 | 8.8 | 7.3 | 9.0 |
| Al/Ti ratio |  | 80 | 80 | 80 | 80 |
| B/Ti ratio |  | 3 | 3 | 3 | 3 |
| Hydrogen feed to $2^{nd}$ reactor (ppm) |  | 4 | 5 | 3 | 5 |
| Reaction | $1^{st}$ Reactor | 101 | 117 | 111 | 107 |
| temperature | $2^{nd}$ Reactor | 171 | 176 | 167 | 177 |
| Polymer from | MI | 0.03 | 0.10 | 0.07 | 0.05 |
| $1^{st}$ Reactor | Density | 0.903 | 0.905 | 0.899 | 0.909 |
| Polymer from | MI | 1.09 | 2.30 | 1.12 | 3.15 |
| $2^{nd}$ Reactor | Density | 0.914 | 0.916 | 0.917 | 0.915 |
| GPC of final | Number average MW | 26100 | 24500 | 25700 | 21300 |
| ethylene copolymer | Weight average MW | 89300 | 82100 | 84000 | 76900 |
|  | MW distribution index | 3.42 | 3.35 | 3.27 | 3.61 |

Ethylene ratio = $1^{st}$ reactor : $2^{nd}$ reactor
Ti: referring to Ti in single site catalyst
Al: referring to triisobutylaluminum as cocatalyst
B: referring to triphenylmethyliniumtetrakispentafluorophenyl borate as cocatalyst

TABLE 2

|  |  | Comp. Ex. 1 | Comp. Ex. 2 | Comp. Ex. 3 | Comp. Ex. 4 | Comp. Ex. 5 |
|---|---|---|---|---|---|---|
| Total flow of solution (kg/h) |  | 10.9 | 10.9 | — | — | — |
| Ethylene ratio |  | 0:1 | 4:6 | — | — | — |
| Ratio of 1-octene | $1^{st}$ Reactor | — | 0.30 | — | — | — |
| to ethylene | $2^{nd}$ Reactor | 0.18 | 0.10 | — | — | — |
| Amount of Ti | $1^{st}$ Reactor | — | 4.2 | — | — | — |
| (μmol/kg) | $2^{nd}$ Reactor | 6.5 | 10.7 | — | — | — |
| Al/Ti ratio |  | 80 | 80 | — | — | — |
| B/Ti ratio |  | 3 | 3 | — | — | — |
| Reaction | $1^{st}$ Reactor |  | 101 | — | — | — |
| temperature | $2^{nd}$ Reactor | 155 | 139 | — | — | — |
| Polymer from | MI | — | 0.9 | — | — | — |
| $1^{st}$ Reactor | Density |  | 0.901 | — | — | — |
| Polymer from | MI | 1.02 | 1.45 | 1.0 | 2.00 | 0.64 |
| $2^{nd}$ Reactor | Density | 0.918 | 0.919 | 0.919 | 0.919 | 0.934 |
| GPC of final ethylene | Number average MW | 28200 | 25300 | 32000 | 26000 | 41500 |

TABLE 2-continued

|  |  | Comp. Ex. 1 | Comp. Ex. 2 | Comp. Ex. 3 | Comp. Ex. 4 | Comp. Ex. 5 |
| --- | --- | --- | --- | --- | --- | --- |
| copolymer | Weight average MW | 57800 | 74000 | 115000 | 93000 | 142000 |
|  | MW distribution index | 2.05 | 2.93 | 3.61 | 3.57 | 3.43 |

TABLE 3

|  | Tensile strenghth (kg/cm$^2$) | Impact strength (g) | Haze (%) | Min. heat seal (° C.) | Processing load (Ampere) |
| --- | --- | --- | --- | --- | --- |
| Ex. 1 | 507 | 970 | 7.2 | 104 | 11.1 |
| Ex. 2 | 512 | 1250 | 8.1 | 106 | 10.5 |
| Ex. 3 | 525 | 890 | 10.3 | 108 | 10.8 |
| Ex. 4 | 532 | 720 | 1.2 | 102 | 10.6 |
| Ex. 5 | 519 | 710 | 1.6 | 106 | 10.3 |
| Ex. 6 | 489 | 620 | 2.1 | 104 | 9.8 |
| Ex. 8 | 527 | 950 | 6.7 | 106 | 10.6 |
| Ex. 9 | 525 | 1080 | 1.2 | 108 | 9.8 |
| Ex. 10 | 492 | 960 | 7.0 | 108 | 10.5 |
| Ex. 11 | 488 | 930 | 1.4 | 107 | 9.8 |
| Comp. Ex. 1 | 510 | 675 | 18.6 | 106 | 11.6 |
| Comp. Ex. 2 | 473 | 270 | 12.5 | 108 | 11.6 |
| Comp. Ex. 3 | 579 | 295 | 34 | 114 | 12.0 |
| Comp. Ex. 4 | 503 | 355 | 2.5 | 110 | 11.3 |

TABLE 4

|  | Hoop stress (hr) | | |
| --- | --- | --- | --- |
|  | 5.0 MPa | 5.2 MPa | Note |
| Ex. 7 | 1811 | 825 | Break upon elongation, 80° C. |
| Comp. Ex. 5 | 798 | 118 | |

Tables 1-1, 1-2 and 2 show the polymerization conditions and physical properties of polymers produced under individual condition in Examples 1 to 11 and Comparative Examples 1 to 5. In Tables 1-1, 1-2 and 2, it was confirmed that the polymer prepared by using single site catalyst in 2-stage reaction process showed broad molecular weight distribution of 3 or more. A few limited examples of the catalysts according to the invention clearly show the features of single site catalysts, in spite of some differences in degree of comonomer coupling and activity. It is found that the copolymers prepared according to the process proposed by the invention show more excellent physical properties that those of conventional products.

Table 3 shows the physical properties of films prepared in Examples 1 to 6, 8 to 11, and Comparative Examples 1 and 2. It is found that most of the physical properties of the films according to the invention were improved in spite of similar level of MI and density. In particular, the processing load of the extruder was significantly decreased due to broader molecular weight distribution, which would achieve saving of energy consumption and enhanced production rate upon manufacturing.

In Examples 1, 2, 3, 8 and 10, and Comparative Example 2, resins synthesized by using different metallocene catalysts through the same process were analyzed, and blown films processed therefrom were compared. The metallocene catalyst used in Comparative Example 2 does not fall under the scope of the metallocene catalyst according to the present invention. The ethylene copolymer prepared through the first reactor by using the catalyst does not provide high molecular weight resin at corresponding reaction temperature, and blown films thus prepared show large differences in physical properties as compared to the resins from Examples 1, 2, 3, 8 and 10.

The effect of the present invention is revealed when comparing the blown film prepared according to the present invention (Examples 1~3, 8, 10) to the film from conventional product (FN810 Grade from Sk Energy) (Comparative Example 3). Examples 1~3, 8 and 10 shows much improvement in terms of impact strength and heat seal, due to different proportion of high molecular weight, low density section produced from Reactor.

In Examples 4, 5, 6, 9, 11, and Comparative Example 4, resins corresponding to representative MI and density of casting film synthesized according to the process of the invention, and conventional product (FT810 Grade from SK Energy) were subjected to polymer analysis, and tested in terms of physical properties after being processed as film.

Table 4 shows the test results of the pipe prepared from Example 7 and Comparative Example 5, In order to examine the improvement in physical properties of pipe, measured was slow crack growth at 80° C. according to ISO 13479, as described above. Polymers from Example 7 and from Comparative Example 5 were individually processed as pipe having outer diameter of 16 mm and thickness of 1.45 mm, and hoop stress of 5.5 MPa and 5.65 MPa, respectively, were applied thereto at 80° C. The time duration up to breakage is recorded.

As can be seen from Table 4, the pipe prepared from Example 7, wherein high molecular weight, low density section added to the stage-1 reactor, showed enhanced durability.

Though the present invention is described in detail with referring to Examples as above and drawings accompanied, a person having ordinary skill in the art in the field of industry to which the invention belongs can make various replacement, modification or alteration without departing from the spirit or scope of the invention, which was defined by appended claims.

INDUSTRIAL APPLICABILITY

From the ethylene copolymers prepared according to the invention, obtained can be molded articles used as blown film, casting film, injection molding, blow molding or pipe.

The film can be formed as blown film or casting film to provide mono-layer or multi-layer film for package. They can be applied to the use for shrinkage film, film for heavy package, film for freeze package, film for automatic package, stretch wrap, bags, or the like.

The invention claimed is:

1. A process for preparing ethylene copolymer, which comprises
   (a) polymerizing ethylene and one or more C3-C18 α-olefin comonomer(s) in the presence of a catalyst composition containing a transition metal catalyst represented by Chemical Formula (1) in one or more adiabatic solution-phase reactor(s) equipped with feed cooler and feed heater to produce a first copolymer; and
   (b) passing the first copolymer prepared from stage (a) through at least one other adiabatic solution-phase reactor(s) equipped with feed cooler and feed heater and containing ethylene or ethylene and at least one C3-C18 α-olefin at a temperature higher than the reaction temperature of stage (a) in the presence of the same catalyst composition employed in stage (a) in order to prepare polymer of high temperature which contains ethylene and C3-C18 α-olefin copolymer composition,

[Chemical Formula 1]

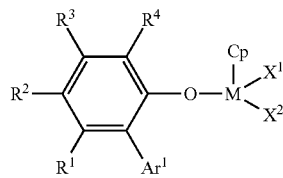

in the formula, M represents transition metal from Group 4 in the Periodic Table of Elements;

Cp represents a cyclopentadienyl ring which is $\eta^5$ bonded to the core metal M, or a ring system containing a fused cyclopentadienyl ring, in which the cyclopentadienyl ring or the ring system containing a fused cyclopentadienyl ring may be further substituted by one or more substituents selected from (C1-C20)alkyl, (C6-C30)aryl, (C2-C20)alkenyl and (C6-C30)ar(C1-C20)alkyl;

$R^1$ through $R^4$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of $R^1$ through $R^4$ may be linked to an adjacent substituent via (C3-C12) alkylene or (C3-C12) alkenylene with or without containing a fused ring to form an alicyclic ring, or a monocyclic or polycyclic aromatic ring;

$Ar^1$ represents (C6-C30)aryl or (C3-C30)heteroaryl containing one or more heteroatom(s) selected from N, O and S;

$X^1$ and $X^2$ independently represent halogen atom, (C1-C20)alkyl, (C3-C20)cycloalkyl, (C6-C30)ar(C1-C20)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, or

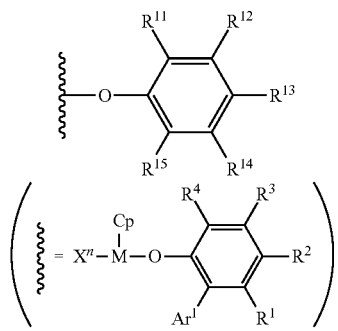

wherein n is an integer of 1 or 2;

$R^{11}$ through $R^{15}$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or $R^{11}$ through $R^{15}$ may be linked to an adjacent substituent via (C3-C12)alkylene or (C3-C12) alkenylene with or without containing a fused ring to form an alicyclic ring, or a monocyclic or polycyclic aromatic ring; and the alkyl, aryl, cycloalkyl, aralkyl, alkoxy, alkylsiloxy, arylsiloxy, alkylamino, arylamino, alkylthio or arylthio of $R^1$ through $R^4$, $R^{11}$ through $R^{15}$, $X^1$ and $X^2$; the ring formed by linkage of each of $R^1$ through $R^4$ or $R^{11}$ through $R^{15}$ to an adjacent substituent via alkylene or alkenylene; or the aryl or heteroaryl of $Ar^1$ and $Ar^{11}$ may be further substituted by one or more substituent(s) selected from halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro and hydroxyl.

2. A process for preparing ethylene copolymer, which comprises (a) polymerizing ethylene and one or more C3-C18 α-olefin comonomer(s) in the presence of a catalyst composition containing a transition metal catalyst represented by Chemical Formula (1) in one or more adiabatic solution-phase reactor(s) equipped with feed cooler and feed heater to produce a first copolymer;

(b) reacting the ethylene or ethylene and one or more C3-C18 α-olefin at a temperature higher than the reaction temperature of stage (a) in the presence of the same catalyst composition employed in stage (a) in at least one other adiabatic solution-phase reactor(s) equipped with feed cooler and feed heater, in order to prepare a second copolymer; and (c) mixing the first copolymer with the second copolymer;

[Chemical Formula 1]

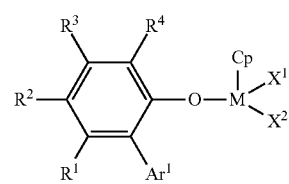

in the formula, M represents transition metal from Group 4 in the Periodic Table of Elements;

Cp represents a cyclopentadienyl ring which is $\eta^5$ bonded to the core metal M, or a ring system containing a fused cyclopentadienyl ring, in which the cyclopentadienyl ring or the ring system containing a fused cyclopentadienyl ring may be further substituted by one or more substituents selected from (C1-C20) alkyl, (C6-C30) aryl, (C2-C20)alkenyl and (C6-C30)ar(C1-C20)alkyl;

$R^1$ through $R^4$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of $R^1$ through $R^4$ may be linked to an adjacent substituent via (C3-C12) alkylene or (C3-C12) alkenylene with or without containing a fused ring to form an alicyclic ring, or a monocyclic or polycyclic aromatic ring;

$Ar^1$ represents (C6-C30)aryl or (C3-C30)heteroaryl containing one or more heteroatom(s) selected from N, O and S;

$X^1$ and $X^2$ independently represent halogen atom, (C1-C20)alkyl, (C3-C20)cycloalkyl, (C6-C30)ar(C1-C20) alkyl, (C1-C20)alkoxy, (C3-C20)alkylsiloxy, (C6-C30) arylsiloxy, (C1-C20)alkylamino, (C6-C30)arylamino, (C1-C20)alkylthio, (C6-C30)arylthio, or

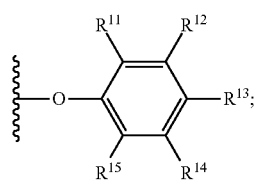

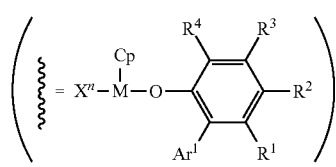

wherein n is an integer of 1 or 2;

$R^{11}$ through $R^{15}$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or $R^{11}$ through $R^{15}$ may be linked to an adjacent substituent via (C3-C12)alkylene or (C3-C12) alkenylene with or without containing a fused ring to form an alicyclic ring, or a monocyclic or polycyclic aromatic ring; and the alkyl, aryl, cycloalkyl, aralkyl, alkoxy, alkylsiloxy, arylsiloxy, alkylamino, arylamino, alkylthio or arylthio of $R^1$ through $R^4$, $R^{11}$ through $R^{15}$, $X^1$ and $X^2$; the ring formed by linkage of each of $R^1$ through $R^4$ or $R^{11}$ through $R^{15}$ to an adjacent substituent via alkylene or alkenylene; or the aryl or heteroaryl of $Ar^1$ and $Ar^{11}$ may be further substituted by one or more substituent(s) selected from halogen atom, (C1-C20)alkyl, (C3-C20)cycloalkyl, (C6-C30)aryl, (C6-C30)ar(C1-C10)alkyl, (C1-C20)alkoxy, (C3-C20) alkylsiloxy, (C6-C30)arylsiloxy, (C1-C20)alkylamino, (C6-C30)arylamino, (C1-C20)alkylthio, (C6-C30) arylthio, nitro and hydroxyl.

3. A process for preparing ethylene copolymer according to claim 1, wherein M is Ti in the transition metal catalyst of Chemical Formula (1).

4. A process for preparing ethylene copolymer according to claim 3, wherein the transition metal catalyst is selected from the compounds represented by one of the following Chemical Formulas:

[Chemical Formula 1-1]

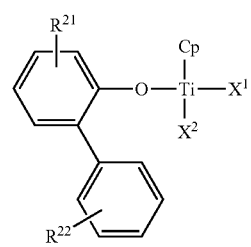

[Chemical Formula 1-2]

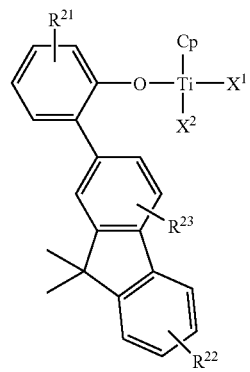

[Chemical Formula 1-3]

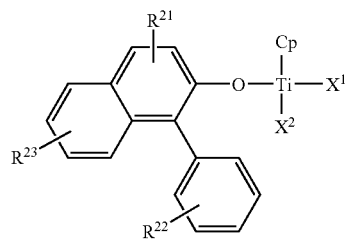

[Chemical Formula 1-4]

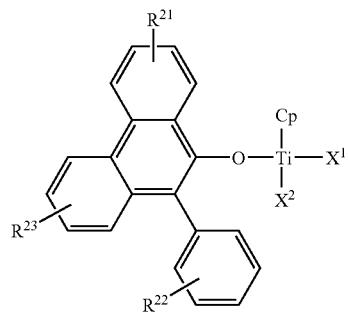

[Chemical Formula 1-5]

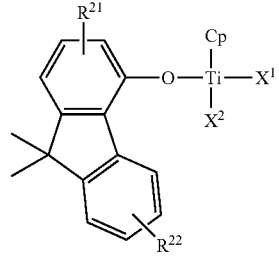

[Chemical Formula 1-6]

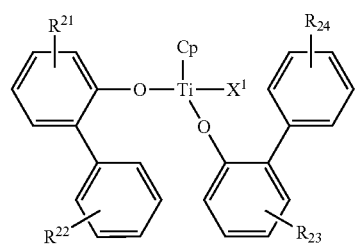

[Chemical Formula 1-7]

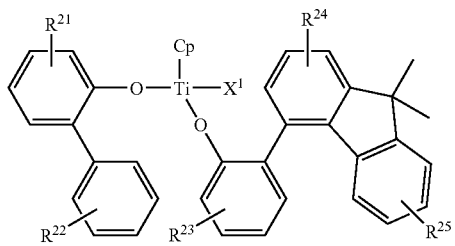

[Chemical Formula 1-8]

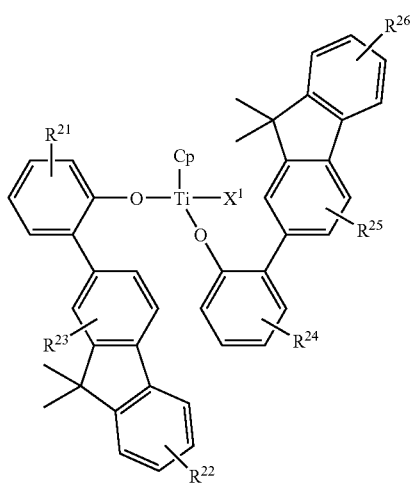

[Chemical Formula 1-9]

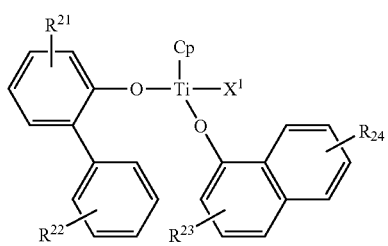

[Chemical Formula 1-10]

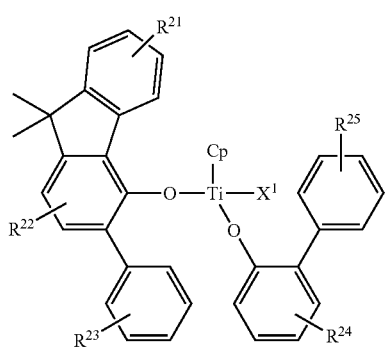

[Chemical Formula 1-11]

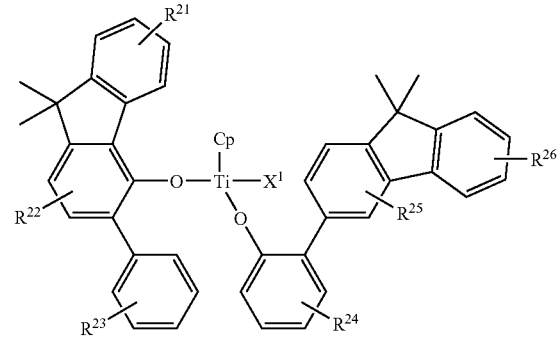

[Chemical Formula 1-12]

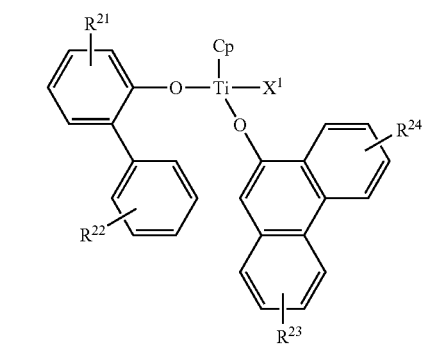

[Chemical Formula 1-13]

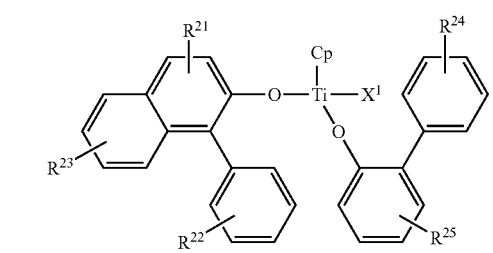

[Chemical Formula 1-14]

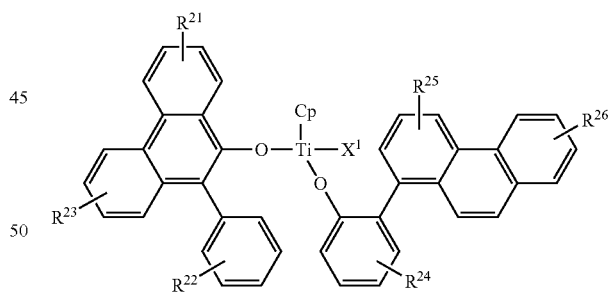

in the formulas, $R^{21}$ through $R^{26}$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of $R^{21}$ through $R^{26}$ may be linked to an adjacent substituent via (C3-C12)alkylene or (C3-C12) alkenylene with or without containing a fused ring to form an alicyclic ring, or a monocyclic or polycyclic aromatic ring; the alkyl, aryl, cycloalkyl, aralkyl, alkoxy, alkylsiloxy, arylsiloxy, alkylamino, arylamino, alkylthio or arylthio of $R^{21}$ through $R^{26}$ may be further substituted by one or more substituent(s) selected from halogen atom, (C1-C20)

alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro and hydroxyl;

Cp represents a cyclopentadienyl ring which is η⁵ if bonded to the core metal M, or a ring system containing a fused cyclopentadienyl ring, in which the cyclopentadienyl ring or the ring system containing a fused cyclopentadienyl ring may be further substituted by one or more substituents selected from (C1-C20) alkyl, (C6-C30)aryl, (C2-C20)alkenyl and (C6-C30)ar(C1-C20)alkyl; and $X^1$ and $X^2$ represent methyl or Cl.

5. A process for preparing ethylene copolymer according to claim 4, wherein the transition metal catalyst is selected from the following compounds:

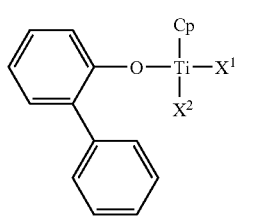
1-1-1

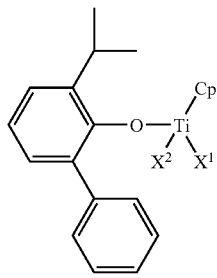
1-1-2

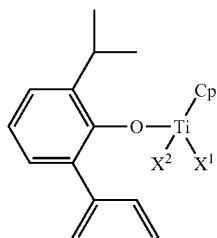
1-2-1

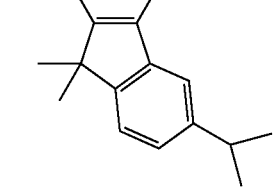
1-3-1

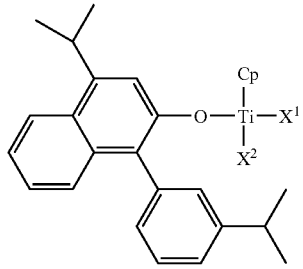

-continued

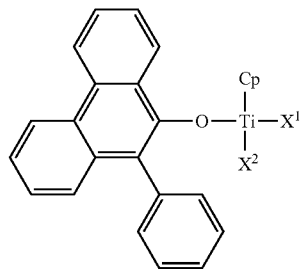
1-4-1

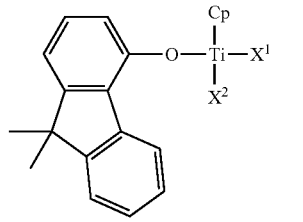
1-5-1

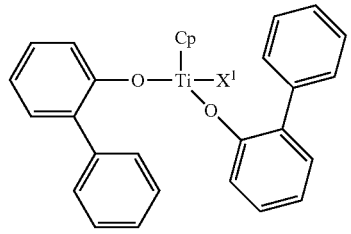
1-6-1

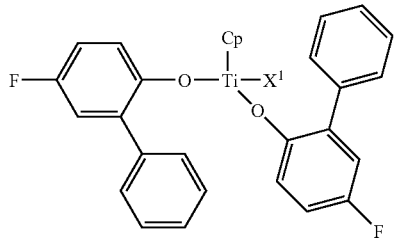
1-6-2

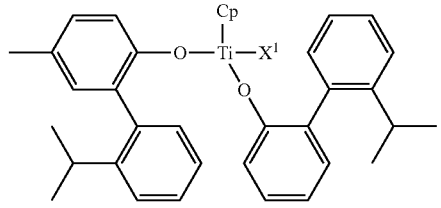
1-6-3

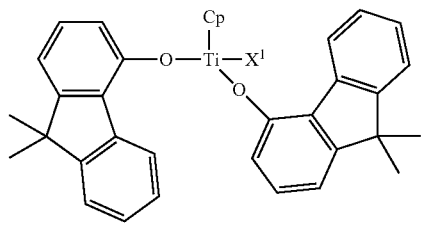
1-6-4

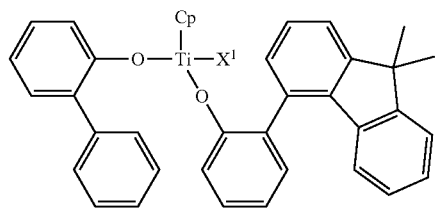
1-7-1

1-8-1
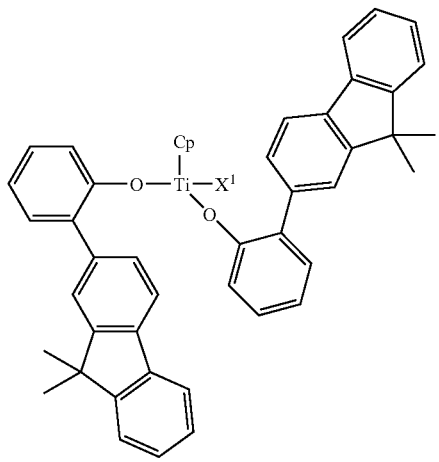

1-9-1
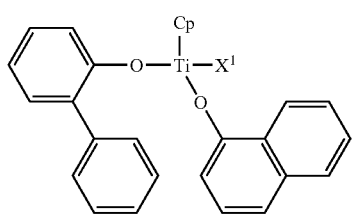

1-10-1
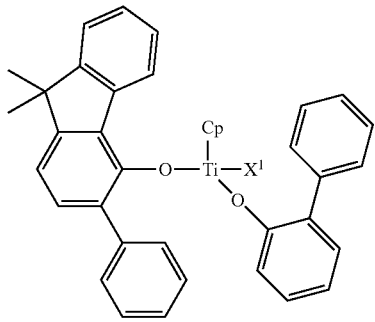

1-11-1
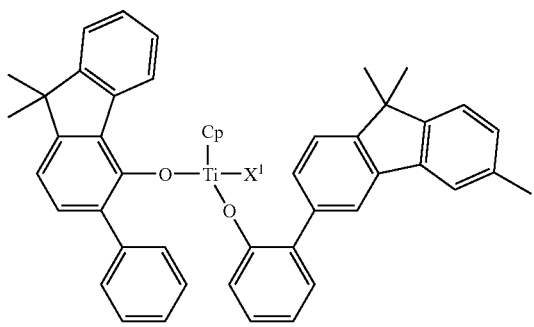

1-12-1
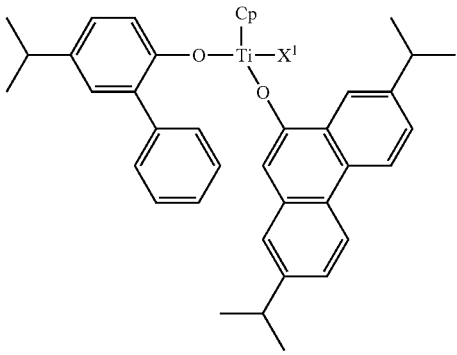

1-13-1
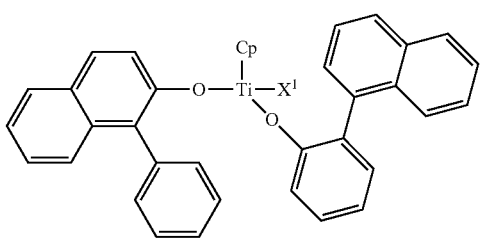

1-14-1
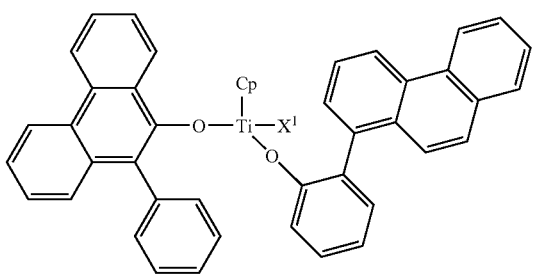

in the formulas, Cp represents a cyclopentadienyl ring which is $\eta^5$ bonded to the core metal M, or a ring system containing a fused cyclopentadienyl ring, in which the cyclopentadienyl ring or the ring system containing a fused cyclopentadienyl ring may be further substituted by one or more substituents selected from (C1-C20)alkyl, (C6-C30)aryl, (C2-C20)alkenyl and (C6-C30)ar(C1-C20)alkyl; and $X^1$ and $X^2$ represent methyl or Cl.

6. A process for preparing ethylene copolymer according to claim 1, wherein the catalyst composition comprises the transition metal catalyst; and cocatalyst selected from aluminoxane compounds, alkylaluminum compounds and boron compounds, and mixtures thereof.

7. A process for preparing ethylene copolymer according to claim 6, wherein the ratio of the transition metal catalyst to the cocatalyst is from 1:1 to 1:2,000 on the basis of the molar ratio of transition metal M: aluminum atom.

8. A process for preparing ethylene copolymer according to claim 6, wherein the ratio of the transition metal catalyst to the cocatalyst is from 1:0.1 to 1:50 on the basis of the molar ratio of transition metal M: boron atom.

9. A process for preparing ethylene copolymer according to claim 7, wherein the ratio of the transition metal catalyst to the cocatalyst is 1:0.1~50:1~1,000 on the basis of the molar ratio of transition metal M: boron atom: aluminum atom.

10. A process for preparing ethylene copolymer according to claim 1, wherein the reaction temperature is from 80 to 210° C. for stage (a), and from 90 to 220° C. for stage (b), and the reaction pressure for each stage is from 20 to 500 atm.

11. A process for preparing ethylene copolymer according to claim 1, wherein the α-olefin comonomer of stage (a) and (b) is selected from propylene, 1-butene, 1-pentene, 4-methyl-1-pentene, 1-hexene, 1-octene, 1-decene, 1-dodecene, and mixtures thereof.

12. A process for preparing ethylene copolymer according to claim 1, wherein the amount of ethylene and one or more C3-C18 α-olefin comonomer of stage (a) and (b) is 60~99% by weight of ethylene and 1~40% by weight of α-olefin comonomer.

13. A process for preparing ethylene copolymer according to claim 1, wherein 10-70% by weight of the polymer is prepared from stage (a) and 30-90% by weight of the polymer is prepared from stage (b).

14. A process for preparing ethylene copolymer according to claim 1, wherein the polymer prepared from stage (a) has MI of 0.001 to 2.0 g/10 min and density of 0.860 to 0.925 g/cm$^3$, and the polymer prepared from stage (b) has MI of 0.1 to 100.0 g/10 min and density of 0.900 to 0.970 g/cm$^3$.

15. A process for preparing ethylene copolymer according to claim 1, wherein the molecular weight distribution index of ethylene copolymer is 2.8 to 30.

16. A process for preparing ethylene copolymer according to claim 2, wherein 10-70% by weight of the polymer is prepared from stage (a) and 30-90% by weight of the polymer is prepared from stage (b).

17. A process for preparing ethylene copolymer according to claim 2, wherein the polymer prepared from stage (a) has MI of 0.001 to 2.0 g/10 min and density of 0.860 to 0.925 g/cm$^3$, and the polymer prepared from stage (b) has MI of 0.1 to 100.0 g/10 min and density of 0.900 to 0.970 g/cm$^3$.

18. A process for preparing ethylene copolymer according to claim 2, wherein the molecular weight distribution index of ethylene copolymer is 2.8 to 30.

* * * * *